(12) United States Patent
Pau et al.

(10) Patent No.: US 11,366,302 B2
(45) Date of Patent: Jun. 21, 2022

(54) POLARIZATION AND PHASE MICROSCOPE

(71) Applicant: Arizona Board of Regents on Behalf of the University of Arizona, Tucson, AZ (US)

(72) Inventors: Stanley Pau, Tucson, AZ (US); Rongguang Liang, Tucson, AZ (US)

(73) Assignee: Arizona Board of Regents on behalf of the University of Arizona, Tucson, AZ (US)

(*) Notice: Subject to any disclaimer, the term of this patent is extended or adjusted under 35 U.S.C. 154(b) by 0 days.

(21) Appl. No.: 16/644,987

(22) PCT Filed: Sep. 7, 2018

(86) PCT No.: PCT/US2018/050063
§ 371 (c)(1),
(2) Date: Mar. 6, 2020

(87) PCT Pub. No.: WO2019/051301
PCT Pub. Date: Mar. 14, 2019

(65) Prior Publication Data
US 2020/0209602 A1  Jul. 2, 2020

Related U.S. Application Data

(60) Provisional application No. 62/556,193, filed on Sep. 8, 2017.

(51) Int. Cl.
*G02B 21/00* (2006.01)
*G01M 11/00* (2006.01)
(Continued)

(52) U.S. Cl.
CPC ....... *G02B 21/0092* (2013.01); *G01M 11/331* (2013.01); *G01N 21/21* (2013.01); *G02B 21/18* (2013.01); *G01N 2021/216* (2013.01)

(58) Field of Classification Search
CPC .................................................. G02B 21/92
(Continued)

(56) References Cited

U.S. PATENT DOCUMENTS 7,483,145 B2* 1/2009 Szwaykowski .... G01B 9/02081
356/491
2003/0223073 A1 12/2003 VanWiggeren et al.
(Continued)

FOREIGN PATENT DOCUMENTS

CN  103579276 A  *  2/2014

OTHER PUBLICATIONS

International Search Report and Written Opinion for PCT/US18/50063, dated Nov. 21, 2018, 16 pages.

*Primary Examiner* — Tarifur R Chowdhury
*Assistant Examiner* — Omar H Nixon
(74) *Attorney, Agent, or Firm* — Klarquist Sparkman, LLP

(57) ABSTRACT

Apparatus and methods are disclosed for measuring polarization properties and phase information, for example as can be used in microscopy applications. According to one example of the disclosed technology, an apparatus includes a light source, an interferometer configured to receive light generated by the light source and split the received light into two split beam outputs. The split beam outputs including combined, interfering light beams. Two light sensors, each including a polarization-sensitive focal plane array receive a respective one of the split beam outputs from the interferometer. Thus, some examples of the disclosed technology allows for simultaneous or concurrent measurement of properties of light including intensity, wavelength, polarization, and phase. The polarization-sensitive focal plane array includes a number of macropixels, each of which includes superpixels having different polarization filtering properties, (Continued)

each of which includes one or more pixels, which comprise filters for different colors.

24 Claims, 11 Drawing Sheets

(51) Int. Cl.
 *G01N 21/21* (2006.01)
 *G02B 21/18* (2006.01)
(58) Field of Classification Search
 USPC .......................................................... 356/491
 See application file for complete search history.

(56) References Cited

U.S. PATENT DOCUMENTS

| | | | |
|---|---|---|---|
| 2005/0078295 A1* | 4/2005 | Tansey | G01B 9/02003 356/4.1 |
| 2007/0252988 A1 | 11/2007 | Levy | |
| 2012/0140239 A1* | 6/2012 | Lee | G01B 9/02021 356/491 |
| 2012/0224183 A1* | 9/2012 | Fay | G01B 11/2441 356/491 |
| 2013/0027713 A1* | 1/2013 | Kudenov | G01J 4/04 356/491 |
| 2015/0285684 A1 | 10/2015 | Robinson et al. | |
| 2016/0202048 A1* | 7/2016 | Meng | G06T 7/557 348/136 |
| 2017/0160148 A1 | 6/2017 | Saeki | |

\* cited by examiner

POLARIZATION AND PHASE MICROSCOPE

CROSS-REFERENCE TO RELATED APPLICATIONS

This is the U.S. National Stage of International Application No. PCT/US2018/050063, filed Sep. 7, 2018, which was published in English under PCT Article 21(2), which in turn claims the benefit of and priority to U.S. Application No. 62/556,193, filed Sep. 8, 2017, which applications are incorporated by reference in their entirety herein.

ACKNOWLEDGMENT OF GOVERNMENT SUPPORT

This invention was made with government support under Grant No. 1455630 awarded by the National Science Foundation. The government has certain rights in the invention.

BACKGROUND

Many diseases have their origins in tissue and cell dysfunction caused by congenital or acquired genetic deficiency. Cell and tissue imaging plays a central role in the screening, treatment, and monitoring of various tissue and cell dysfunction. The ability to measure live cells and follow motions and processes in real time provides valuable information to the study of cellular dynamics, motility, and cell and tissue morphology. However, most cells are transparent three-dimensional objects that are very similar to their surrounding environment in terms of absorbance and reflection. Fluorescence staining and tagging are widely used to enhance the contrast between the cell target and the background. However, fluorescent contrast agents have a number of issues that may limit their applications in live cell imaging, such as photobleaching, cytotoxicity, and potential disturbance of normal cellular behaviors.

A large majority of biological samples involve three-dimensional (3D), transparent objects that have similar absorbance and reflection based on their environment, making identification difficult. Therefore, there is ample opportunity to improvements in microscopy of tissue, including tissue having live cells.

SUMMARY

Apparatus and methods are disclosed for using two complementary methods of phase and polarization imaging to measure multiple properties of light interacting with a sample (e.g., a live cell).

In some examples of the disclosed technology, an apparatus includes a light source, an interferometer configured to receive light generated by the light source and to split the received light into two or more split beam outputs. At least one of the light beam outputs includes combined, interfering light beams. The apparatus further includes two or more light sensors. Each of the light sensors includes a polarization-sensitive focal plane array. Each of the light sensors is situated to receive one of two or more split beam outputs generated by the interferometer. In some examples of the disclosed technology, the interferometer includes a first beam splitter and a second beam splitter. The first beam splitter is situated to reflect a first portion of the received light onto a sample and to reflect a second portion of the light to a second beam splitter. The second beam splitter is situated to reflect a first portion of the reflected light it received from the first beam splitter to the first light sensor and to reflect a second portion of the light received from the first beam splitter to the second light sensor. In some examples, the interferometer further includes a third beam splitter situated between the first beam splitter and the sample. The beam splitter is situated to reflect a portion of light to a mirror in a moveable reference arm. In some examples, one or more of the beam splitter are polarizing beam splitters. In some examples, the interferometer is arranged in a Mach-Zehnder, a Fizeau, or a Michelson configuration.

In some examples, the polarization-sensitive focal plane array includes a number of macropixels. Each of the macropixels includes a first superpixel having a first polarization filter configured to transmit light of a first state of polarization and to substantially block light of a second state of polarization orthogonal to the first state. A second superpixel of the block includes a second polarization filter configured to transmit light of a third state of polarization and to substantially block light of a fourth state of polarization orthogonal to the third state of polarization. The first and third states of polarization are different, for example 0° and 90°, respectively. In some examples, the superpixels further include an array of pixels. At least one of the micro pixels is configured to block light having a certain range of wavelengths. For example, each of the pixels can be assigned to transmit light that is substantially red, green, or blue. In some examples, at least one of the light sensors includes a camera and a charge coupled device or a CMOS digital image sensor. In some examples, the light source is produced with a light-emitting diode, a liquid crystal, or a timed multiplexed light source.

In some examples, a computer system is coupled to the light sensors via an input interface. The computer executes instructions in order to perform image processing methods using data received from at least one of the light sensors. In some examples, an interferometer microscope includes any one of the example apparatus configurations disclosed herein. In some examples, a method includes providing an interferometer arranged according to any of the disclosed examples, and producing an image using data received from the first and/or second light sensors of the apparatus. In some examples, the method includes manufacturing any one of the disclosed apparatus. In some examples, the apparatus can include one, two, three, four, five, six, or greater number of light sensors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Any trademarks used herein remain the property of their respective owners. The foregoing and other objects, features, and advantages of the disclosed subject matter will be apparent from the following detailed description, which proceeds with reference to the accompanying figures.

DETAILED DESCRIPTION

I. General Considerations

Figure 1:
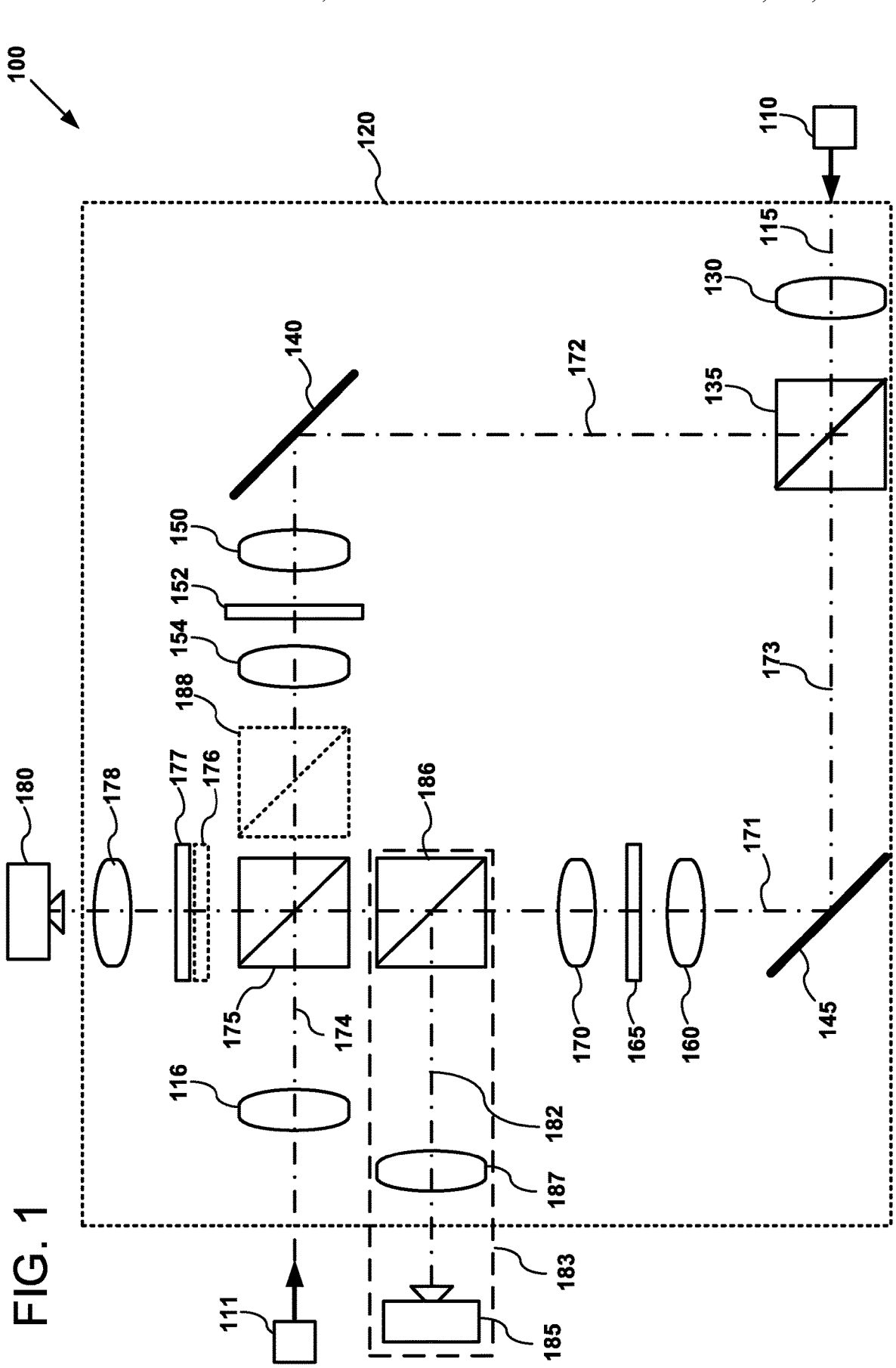
FIG. 1 is a schematic diagram depicting an example configuration of an apparatus, as can be implemented in certain examples of the disclosed technology.

Examples of methods, apparatus, and systems for the design and use of interferometers with light sensors and polarization sensitive focal plane arrays are disclosed. The disclosed methods, apparatus, and systems should not be construed as being limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods. Additionally, the description sometimes uses terms like "produce," "generate," "propagate," "receive," "emit," and "provide" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Moreover, unless the context dictates otherwise, the term "coupled" means mechanically, electrically, or electromagnetically connected or linked and includes both direct connections or direct links and indirect connections or indirect links through one or more intermediate elements not affecting the intended operation of the described system.

Additionally, certain terms may be used such as "up," "down," "upper," "lower," and the like. These terms are used, where applicable, to provide some clarity of description when dealing with relative relationships. But, these terms are not intended to imply absolute relationships, positions, and/or orientations.

In certain examples of the disclosed technology, innovative methods can be performed on computing hardware incorporating one or more processors, storage, and memory. The processors can be communicatively coupled to non-transitory computer-readable media on which are stored instructions embodying the innovative methods described herein. Suitable computer-implemented methods can use computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available, proprietary, hosted, or dedicated computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media).

II. Introduction to the Disclosed Technology

Phase and polarization imaging are two different, yet complementary imaging methods. Phase and polarization imaging can be used to observe transparent cells and tissues without staining, labeling or marking samples. Phase imaging can be used to monitor dynamic cell phenomena (membrane fluctuations, cell swelling, action potential activation, and other phenomena) by detecting variations in refractive index and thicknesses of cells and tissues. By measuring birefringence, polarization imaging can reveal orientational order in native molecular structures inside living cells, tissues, and whole organisms. However, traditional polarization and phase microscopes are not inherently quantitative. Quantitative phase imaging (QPI) can be used to quantify optical path difference (OPD) variations caused by small variations in refractive index and thicknesses of cells and tissues. Apparatus using QPI can be applied to track motions of cells, monitor the interaction between cells, and follow small motions of subcellular substructures or organelles. Off-axis QPI methods allow fast acquisition rates, but tend to sacrifice transverse resolution. Phase shifting QPI techniques obtain interferograms sequentially and can achieve high resolution but tend to be sensitive to motion and vibration.

As will be readily apparent to one of ordinary skill in the art having the benefit of the present disclosure, a polarization filter that transmits a particular polarization state is understood to substantially block light of an orthogonal polarization state. For example, a linear polarization filter that transmits 0°-oriented linearly polarized light can substantially block light of 90°-oriented linear polarization. A polarization filter that transmits right-circularly polarized light can substantially block left circularly polarized light. Because light of one polarization state can be resolved into components of light of two or more different polarization states, a polarization filter for, say, 45°-oriented light can detect linearly polarized light having 0°- or 90°-oriented linear polarization, or even right-circular polarization, albeit with reduced sensitivity, but will substantially block 135°-oriented linearly polarized light, which is orthogonal to 45°. An optical component such as a polarization filter or a color filter is said to "transmit" a certain kind of light when the certain kind of light entering one surface of the optical component results in substantially the same kind of light exiting another surface of the optical component. Light that is not transmitted is said to be blocked, and may be reflected or absorbed. If two parallel electromagnetic waves of substantially the same frequency and having respective polarization states and respective electric field vectors are such that the vector dot product of the electric field vectors, averaged over one period, is substantially zero for any temporal phase shift between the two waves, then the two polarization states are said to be "orthogonal." In some examples, the blocked polarization state may have transmission through the filter that is less than 0.01%, or 0.1%, or 1%, or 2%, or 5%, or 10%, or 20%, or even 30%.

III. Example Apparatus for Polarization and Phase Microscope

A microscope implemented according to certain examples of the disclosed technology can measure both the spectral dependent quantitative polarization properties and phase information of cells and tissue in real time. The disclosed microscope is insensitive to motion and vibration because all the data used to measure the polarization and phase properties are acquired in a single shot. Some examples of the microscope are configured to measure all four properties of light interacting with cells and tissue: intensity, wavelength, polarization, and phase.

FIG. 1 is a schematic diagram depicting an example system 100 in which special dependent quantitative polarization properties and phase information of a sample can be measured in real time. In certain examples, the apparatus can measure intensity, wavelength, polarization, and phase of light simultaneously or concurrently.

A light source 110 comprising a polarization state generator emits a beam 115 of light into an objective lens of an interferometer configured according to the disclosed technology. The light source 110 can produce light by one or more of the following: a light emitting diode, a liquid crystal, or a time-multiplexed light source. In other examples, a 350 W mercury-xenon arc lamp is used as one or both of the light sources 110 and 111. The light from the arc lamp is collimated and the illumination spectra will are selected by, for example, bandpass filters manufactured by Semrock, Inc. A polarization state generator (PSG) (for example, as manufactured by ARCoptix S.A) can be used to generate input polarization states (or Stokes vectors) for illumination.

The interferometer 120 includes an objective lens 130 configured to focus the received light beam 115 onto a first beam splitter 135. The first beam splitter 135 reflects a first portion of the light beam on a path 172 to a first mirror 140 and transmits a second portion of the light beam on a path 173 onto a second mirror 145. The first mirror 140 reflects the light into a condenser lens 150 through a matching phase plate 152 and then through a matching objective lens 154. The second mirror 145 reflects light through a second condenser lens 160, an object or sample 165, and then through an objective lens 170. Portions of the beams transmitted by the first mirror 140 and the second mirror 145 are projected onto a second beam splitter 175. The second beam splitter 175 reflects light from the first mirror 140 and transmits light from the second mirror 145 through a linear polarizer 176, a quarter-wave plate 177, and then through a tube lens 178 into a camera 180 including a light sensor (a pixelated polarization camera). The polarization camera includes a polarization-sensitive focal plane array as will be described in further detail below. As will be readily understood to one of ordinary skill in the art having the benefit of the present disclosure, the light beams can be directed to the sample 165 in any number of ways, for example, the light may be transmitted through the sample, or the light may be projected onto and reflected from the sample 165.

The illustrated system 100 can include a second light source 111 comprising a polarization state generator that transmits light through a focusing lens 116 and onto the second beam splitter 175. A portion of the light from the second light source 111 is transmitted to the first mirror 140 along a path 174, and a second portion 173 of the light from the light source is reflected to the second mirror 145 on the path 171 via the optical components 160 and 170.

The system 100 can further include a tube lens 183 comprising a third beam splitter 186 and a tube lens 187. The second camera 185 is configured to receive light reflected from the third beam splitter 186 along a path 182. The third beam splitter 186 is situated between the second beam splitter 175 and the second mirror 145. These components forming the tube lens can be used for polarization imaging. When performing polarization imaging, the third beam splitter 186 can optionally be situated in a second position 188 as indicated in FIG. 1.

The first camera 180 and the second camera 185 are examples of light sensors. In some examples, the cameras each include a VITA 25K (5120×5120 pixels) (e.g., 1280× 1280 macro pixels, when combined with a polarization-sensitive focal plane array comprising 16×16-pixel macro pixels, as in FIG. 2 or FIG. 5B) CMOS image sensors from ON Semiconductor and a camera kit provided by Dreampact Limited. This VITA 25K image sensor has 25M pixels with 4.5 μm×4.5 μm pixel size and it can be operated at frame rates as fast as 50 fps at full resolution and at 590 fps with 1024×1024 pixels (e.g., 256×256 macro pixels, when combined with a polarization-sensitive focal plane array comprising 16×16-pixel macropixels, as in FIG. 2 or FIG. 5B). The referenced camera kit from Dreampact Limited has an image sensor socket allowing replacement of the stock sensor with polarization sensitive sensors, such as those described below. After integrating a pixelated micropolarizer array with the CMOS sensor, the sensor is installed in the camera sensor socket.

Commercially-available optical components, such as microscope objectives, beamsplitters, polarizers, waveplates, and lenses, can be used to implement the system 100. The field of view, magnification, and resolution are determined by the microscope objective lenses (e.g., objective lens 178). The polarization and phase can be measured simultaneously using the two cameras 180 and 185.

In other examples, a system with a lower cost single camera configuration includes a polarizing beamsplitter (e.g., comprising components 175, 176, and 177) and a fluorescence filter cube (not shown in FIG. 1) mounted onto a motorized stage so that those components can be moved in and out of the optical path for different imaging modes. To match the optical path lengths in the sample path and the reference path for phase imaging, the two paths include the same optical components.

The disclosed apparatus can work in both reflectance and transmission modes. In reflection imaging mode, a flat first surface mirror is placed in the focal plane of the objective in the reference path. In transmission mode, the mirror in the reference path will be replaced with an empty sample container, so that the optical path lengths in the sample and reference paths match. For the example apparatus of FIG. 1, this can be performed by moving the tube lens 183 out of the optical path and replacing the phase plate 152 with an empty sample container, thereby allowing imaging of the sample in transmission mode.

The apparatus of FIG. 1 can be included in a high resolution quantitative polarization and phase microscope that can measure spectral dependent polarization and phase information of cells and tissues in real time. The configuration of the apparatus allows for operation in reflection and transillumination modes. In some examples, a standard having known diameter and refractive index (e.g., a NIST standard glass sphere) can be used as standard sample to calibrate the apparatus of FIG. 1.

IV. Example Polarization Sensitive Focal Plane Array

Figure 2:
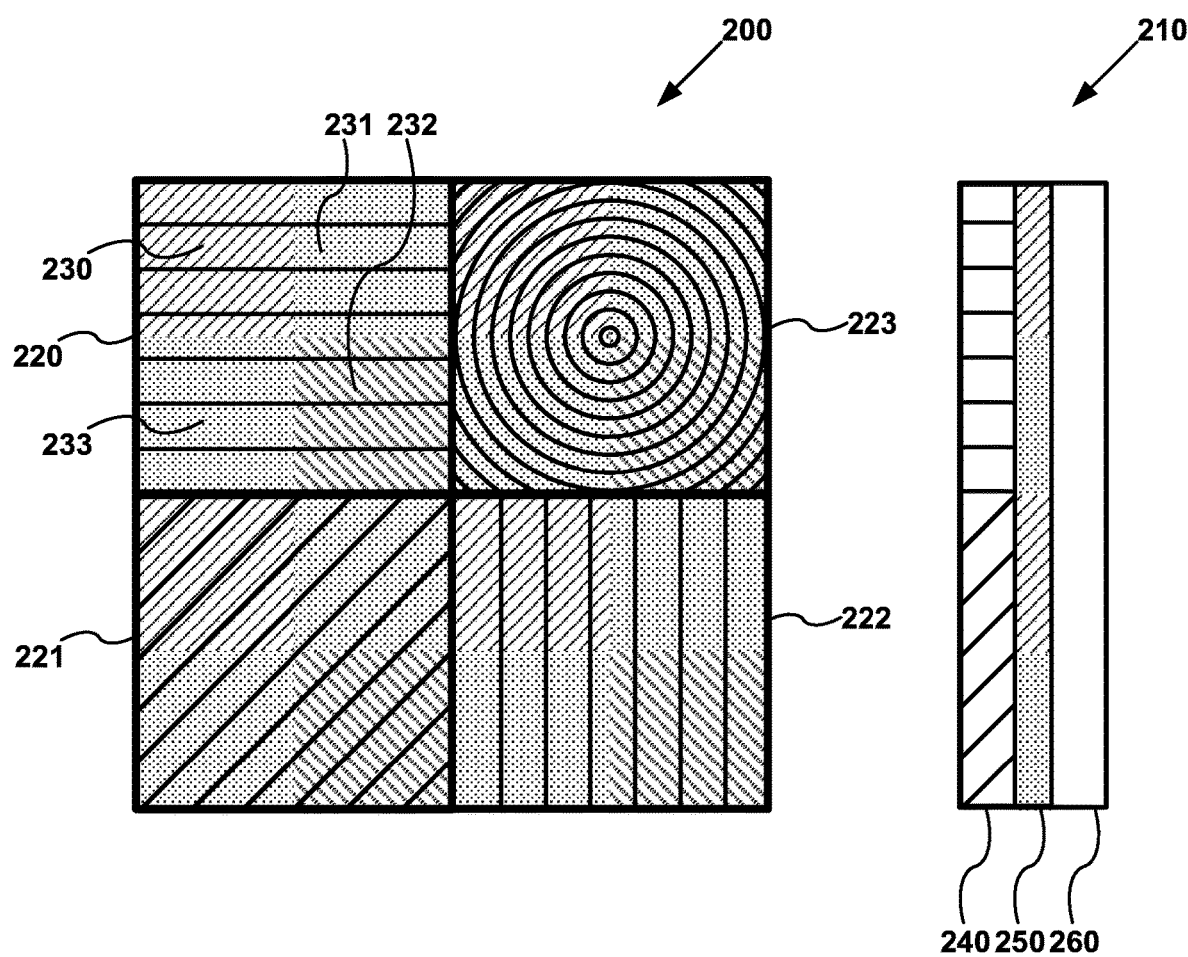
FIG. 2 is a diagram depicting an example polarization-sensitive focal plane array, as can be implemented in certain examples of the disclosed technology.

FIG. 2 is a diagram showing a plan view 200 and a cross-sectional view 210 of a polarization sensitive focal plane array, as can be implemented in certain examples of the disclosed technology. The illustrated focalization plane array represents a portion of the filter covering one macropixel of an image sensor (16×16 sensor pixels of the image sensor).

The pixelated micropolarizer array illustrated in FIG. 2 is an example of a polarization sensitive focal plane array that can be placed next to the color filter array of an image sensor within a light sensor apparatus. The illustrated pixelated polarizer array can be fabricated as four broadband (e.g., 400-700 nm) pixelated micropolarizer arrays (e.g., having 9 μm×9 μm pixel size) with one right-circular polarizer superpixel 223 and three linear polarizer superpixels (at 0° (220), 45° (221), and 90° (222), respectively).

The circular micropolarizer can be used for full Stokes polarization imaging. Using the illustrated polarization sensor, the microscope can either capture three phase-shift images for quantitative phase measurement, or four images with different polarization states for quantitative polarization measurement, either of which being captured with a single shot. Therefore a microscope incorporating the apparatus of FIG. 1 is thereby desirably insensitive to motion and vibration, and may attain high resolution quantitative phase and polarization images.

The macropixel is divided into four superpixels 220, 221, 222, and 223, as shown. Each of the illustrated superpixels is configured to modify polarization of light transmitted through the filter in a different manner. For example, the first superpixel 220 transmits light at a first polarization phase that is shifted 90° from the polarization of light transmitted by the third superpixel 222. The second superpixel 221 transmits light oriented at a 45° shift from the polarization of the first superpixel 220. The fourth superpixel transmits light that has a circular polarization.

Within each of the superpixels 220 through 223, each are further divided into four pixels. These four pixels correspond to individual intensity sensors of an image sensor array—each of the four pixels can generate separate light intensity values. For example, the first superpixel 220 is divided into four pixels 230, 231, 232, and 233. The first pixel 230 is configured to transmit light of a particular color or wavelength (e.g., red light, as indicated by the first shading), the second pixel 231 and the fourth pixel 233 are configured to transmit light of a particular color wavelength (e.g., green, as indicated by the second shading), while the third pixel 232 is configured to transmit light of a third particular color or wavelength (e.g., blue, as indicated by the third shading). The other superpixels have similar patterns of pixel color filters. The cross-sectional view 210 shows a slice through the illustrated polarization-sensitive focal plane array. The polarizer array 240 is situated above a color filter array 250 which, in turn, is disposed over a sensitive layer 260 of an image sensor. For example, the sensitive layer 260 can be implemented as an integrated circuit providing charge coupled devices (CCD) or complementary metal oxide semiconductor (CMOS) sensors. Image intensity data received at the sensitive layer 260 can be combined and processed by a computer in order to determine polarization and wavelength data for light received at an image sensor comprising the illustrated focal plane array. In the illustrated example, the sensitive layer 260 can have at least sixteen different light detectors, one behind each pixel.

Pixelated micropolarizer arrays can be used for imaging polarimetry. Linear micropolarizer arrays have been fabricated using a variety of techniques including etched dichroic polymers, wire-grid polarizers, liquid crystal (LC) arrays, and photoaligned liquid crystal polymers (LCP). Wire-grid pixelated micropolarizer array, the most common pixelated polarizer array, consists of four linear pixelated polarizers with transmission axes at 0°, 45°, 90°, and 135°. It has been used for quantitative phase measurement interferometry. Pixelated micropolarizer array enables single frame phase measurement so that vibration isolation, phase shifting, or scanning through focus are not needed. It also enables fluorescence polarization imaging and analysis in a single shot. One limitation of wire-grid pixelated polarizer is that it works only for linear polarization and cannot be extended to non-linear polarization due to the fundamental limitation of the technique. Thus, a linear micropolarizer array can be used with a modified apparatus of FIG. 1 to image light of only linear polarization and not circular or elliptical polarization. Another limitation is that several sequential images at different wavelengths are needed to perform spectral-polarization imaging because existing pixelated polarization camera is monochromatic except one custom camera with only 168×256 pixels.

The pixelated micropolarizer array illustrated in FIG. 2 can be manufactured using photoalignment of liquid crystal polymers (LCP). A photo-oriented polymer network (PPN) and a guest-host system in polymer mixture can be deposited on arrays of CCD and CMOS image sensors. In addition, in some examples, multiple layers of a guest-host system are provided on a single substrate to form structures that can require two or more guest layers, such as a circular polarizer that can be formed as a dichroic dye guest-host layer and a quarter wave retarder layer.

In some examples, a layer of a liquid crystal in a polymer (LCP) is coated on top of an aligned PPN so as to align with the PPN. The LCP can be mixed with functionalized dichroic chromophores, but for this technique to be successful, the chromophores (referred to as the "guest") must be soluble in the liquid-crystal polymer (referred to as the "host"). Phase separation between the guest and the host will prevent uniform alignment. In addition, the chromophores must align to the host system in a predetermined way. The solubility and orientability of the guest-host system depend on the chemistry of the solvent, the liquid crystal, and the chromophores. In certain embodiment, the dichroic chromophore and/or semiconductor polymer may exhibit a liquid-crystal phase and can form a polymer film with addition of photo-initiator and monomer. In this case, the liquid-crystal phase, consisting primarily of the dichroic chromophore and/or semiconductor polymer, acts as both the "guest" and the "host" and can be coated on top of an aligned PPN so as to align with the PPN.

LCPs are also referred to herein as "reactive mesogens," and generally are based on liquid-crystal materials having one or more polymerizable groups such as acrylates. Such materials can be polymerized into films, typically by exposure to UV radiation. The LC structure is then fixed by the polymerization. Such LCP layers can be applied to rigid or deformable substrates, such as glass, plastics, metal foils, or other surfaces. PPNs are also referred to herein as linear photo-polymerizable polymers (LPPs). In some examples, fluorescent materials are aligned in an LCP layer so as to emit light in a selected state of polarization. Such fluorescent materials are referred to herein generically as fluorophores. For convenient illustration, embodiments based on the uses of fluorescent dyes as fluorophores are described.

Using this thin film technology, visible linear, elliptical, and circular polarization devices can be manufactured having relatively high spatial resolution, precise optical retardance, and polarization dependent absorption and emission. In other examples, division of focal plane polarimeters (DoFP) can be constructed. This technology allows multi-layer retarder and polarizer, which allows measurement of both circular and linear polarizations. Thus, all four components of the Stokes vector can be measured in a single shot.

The micropolarizer array is precisely placed on top of the sensing pixels of an image sensor (e.g., a CCD or CMOS sensor). Each macropixel of the micropolarizer covers sixteen sensing pixels, as shown in the single macropixel of FIG. 2. The illustrated sensor can detect light with four polarization states for full Stokes polarization imaging at three wavelengths.

In some examples of the disclosed technology, a microscope incorporating the apparatus of FIG. 1 can perform quantitative polarization and phase measurement (in reflection or transillumination mode) at three spectral ranges in real time. In some examples, such a microscope can measure quantitative phase or polarization image at 50 frames per second (fps) at full resolution (5120×5120 pixels), resulting in a 1280×1280 pixels polarization or phase image without interpolation, and frame rates as high as 590 fps at 1024× 1024 pixels. The disclosed microscope can also perform real time fluorescence polarization imaging to track alignment of molecular bonds, of fine structural form, and of fluorescence dipoles.

As will be readily apparent to one of ordinary skill in the art having the benefit of the present disclosure, the technologies disclosed herein can be used in applications other than cell and tissue imaging. For example, and without limitation, the polarization imaging using disclosed pixelated polarization cameras can be applied to cancer screening and image guided surgery for real time identification of tumor margin, as only one shot is needed to capture four polarization images at three wavelengths.

V. Example Application to Quantitative Polarization Imaging

The use of two cameras as discussed above in the apparatus of FIG. 1 can be used to perform quantitative polarization imaging with quantitative phase imaging simultaneously without using a moving component to adjust position of the apparatus components. In some examples using a single camera 185, the stage with the components 175-177 is switched off from the imaging path for polarization imaging. Linear retardance and birefringence of the sample can be measured at three wavelengths in real time with a single shot. Circular retardance can be measured with two shots by utilizing two illuminated polarization states. For example, for performing a full Mueller matrix $M_{sample}$ ($S_{out}=M_{sample} S_{in}$) measurement, the polarization state of the illumination light (input Stokes vectors $S_{in}$) generated by the light sources 110 and 111 is changed by a polarization state generator (PSG) and the output Stokes vector $S_{out}$ is measured. This measurement can be achieved in real time with a minimum of four shots and the camera can work at 440 fps with 1920×1080 pixels. Once the Mueller matrix of the sample is measured, important parameters such as linear diattenuation, diattenuation orientation, circular diattenuation, depolarization index, and other polarization properties at three wavelengths can be calculated directly from the Mueller matrix. The quantitative polarization imaging can also be performed in reflection mode as shown in FIG. 1, using the second light source 111. Desirably, there is no image shift between images of different polarization. In some examples, measurements are quantified based on properties of a sample. For example, if a sample is not birefringent, then a single phase measurement is made. If a sample is birefringent, then two phases are measured. In some examples using birefringent samples, angle of refraction is calculated separately for phase measured along a first axis and a second axis, respectively. Properties of the sample can be calculated by measuring polarization state relative to an internal wave plate. For example, by comparisons of measurements made using pixels or superpixels having different polarization orientation (e.g., superpixels 220, 221, and 222) can be used to calculate angle of refraction for phase along two different axes.

VI. Example Application to Quantitative Phase Imaging

Quantitative phase imaging measures optical path difference (OPD) variations due to small variations in refractive index and thicknesses of structures and materials within cells and tissues. QPI with wire-grid pixelated micropolarizer array (four linear polarizers at 0°, 45°, 90°, and 135° has been demonstrated for cell imaging. Four interferograms are acquired with a single shot and the quantitative phase information is calculated from four interferograms in real time. This phase measuring method can be used in optical metrology. When such QPI technology is used to measure the phase in reflection mode, focusing the light on the mirror surface to provide a double pass through the object reduces the resolution, because the cell or tissue is not at the focusing plane. Such phase microscopes are not designed for measuring the polarization properties of the cell and tissue.

When the apparatus of FIG. 1 is operated in transillumination mode, the light from the light source is separated to the sample beam path 171 and reference path 172 by the polarizing beam splitter 135. The ratio of the light in the sample beam path 171 and the reference path 172 is adjusted by a polarization state generator or by rotating a polarizer relative to the light source 110 to achieve improved fringe contrast. Desirably, the components in the sample path and the reference path are matched components, except the sample, to achieve improved image contrast. The sample beam 171 passes through the sample 165 and the objective lens 170 and the reference beam 172 passes through the matching objective 154. The two beams are combined by the polarization beam splitter 175 and focused onto the camera 180 by the tube lens 178. The quarter-wave plate 177 in front of the tube lens converts the sample and reference beams to right- or left-handed circular polarization to produce interference fringes at the pixelated polarizer.

Interferograms extracted from the pixels with linear polarizers have 90° relative phase shift and can be used to extract quantitative phase information. To measure the phase φ(x,y) of the object, three interferograms with 90° phase shift are sufficient as shown in the set of equations (Eqns. 1-5) below. $I_i$, $I_o$, and $I_R$ are the irradiance of the measured image, object, and reference beams, respectively, $\alpha_i$ is the phase shift between the object and reference beams. $I_1$, $I_2$, and $I_3$ are three polarization states. The optical path difference (OPD) is determined by OPD(x,y)=φ(x,y)/2π. With the measured birefringence properties of the sample, it is possible to compensate the measured phase obtained from the polarization images.

$$I_i(x, y) = \frac{1}{2}\{I_o + I_R + 2\sqrt{I_o I_R} \cos[\varphi(x, y) + \alpha_i]\} \quad \text{(Eq. 1)}$$

$$I_1 = I_{+\frac{\pi}{2}} = \frac{1}{2}\{I_o + I_R + 2\sqrt{I_o I_R} \sin[\varphi(x, y)]\} \quad \text{(Eq. 2)}$$

$$I_2 = \frac{1}{2}\{I_o + I_R + 2\sqrt{I_o I_R} \cos[\varphi(x, y)]\} \quad \text{(Eq. 3)}$$

$$I_3 = I_{-\frac{\pi}{2}} = \frac{1}{2}\{I_o + I_R - 2\sqrt{I_o I_R} \sin[\varphi(x, y)]\} \quad \text{(Eq. 4)}$$

$$\varphi(x, y) = \arctan\left(\frac{I_1 - I_3}{2I_2 - I_1 - I_3}\right) \quad \text{(Eq. 5)}$$

VII. Example Application to Fluorescence Imaging

In some examples of the disclosed technology, the apparatus of FIG. 1 can be adapted to operate in a fluorescence polarization imaging mode, where a fluorescence filter cube is moved to the position of the polarizing beam splitter 175 in the imaging path. For example, a standard fluorescence filter cube manufactured by Olympus can be used in this disclosed microscope when the system works in epi-illumination mode. In a transmission imaging mode, the emission filter is installed in the filter cube, and an excitation filter placed in the illumination path. The illumination polarization state is controlled by a polarization state generator. For each illumination polarization state, four polarization images (one circular and three linear polarization) can be acquired with one shot. With the disclosed apparatus, it is possible to acquire images for four different illumination polarization states at a frame rate of 12.5 fps with full resolution, or 150 fps with 1024×1024 pixels.

VIII. Example Images Produced Using a Micropolarizer Array

Figure 3:
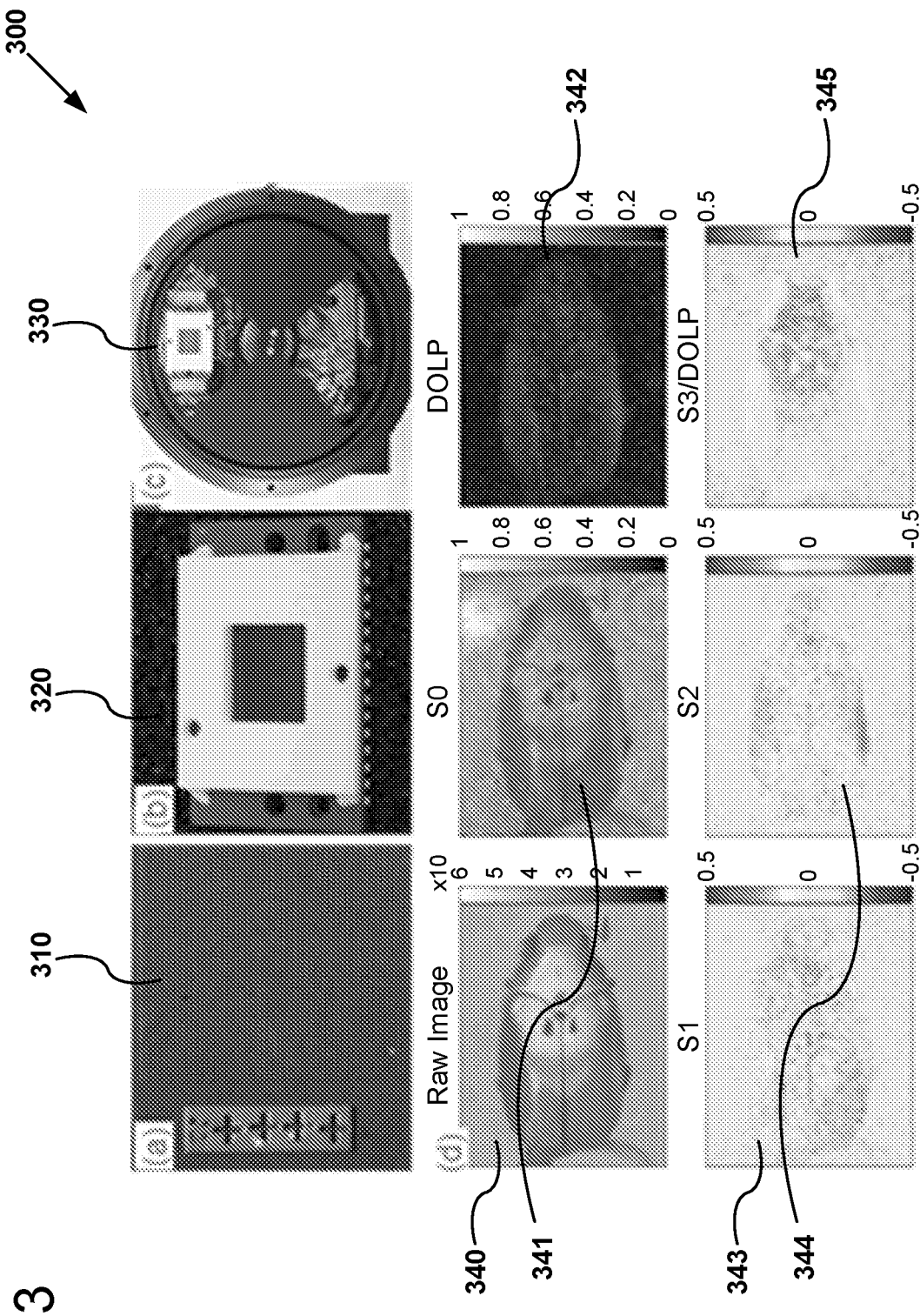
FIG. 3 is a series of images depicting an example of image sensing, as can be generated using certain examples of the disclosed technology.

FIG. 3 is an array of images 300 illustrating an example system in which certain technologies can be implemented. One of the polarimeters used to generate the examples images has a micropolarizer array of one right-hand circular micropolarizer and three linear polarizers with transmission axes at 0°, 45°, and 90°. A first photograph 310 shows a polarizer wafer that has been exposed using a photolithographic mask. A second photograph 320 illustrates a mounted micro polarizer array according to the disclosed technology. A third photograph 330 illustrates an image sensor having a micro polarized array, as can be implemented in certain examples of the disclosed technology. A number of images 340-345 illustrate images of a beetle implemented using a system according to the disclosed technology. The first image represents the raw image data. The other images 341-345 represent measured Stokes components of the image as can be produced using apparatus according to the disclosed technology.

IX. Example Construction of a Polarization Sensor

Figure 4:
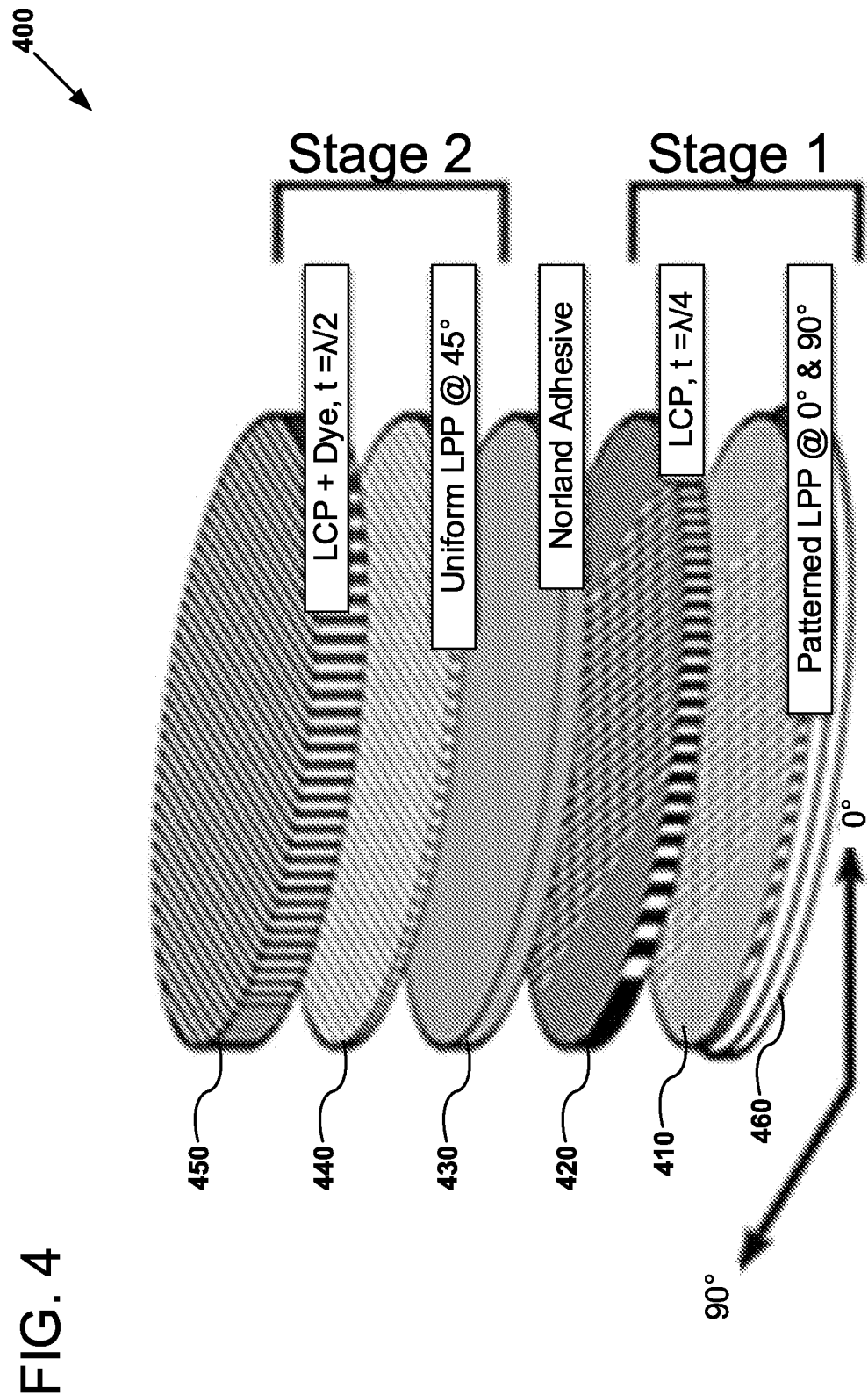
FIG. 4 is a diagram outlining an example of the construction of a patterned circular polarizer, as can be used in certain examples of the disclosed technology.

FIG. 4 is a diagram 400 outlining an example construction of a patterned circular polarizer. As shown in FIG. 4, a number of layers are stacked together to provide the polarizer. A first layer 410 includes a patterned linearly photopolymerizable material on which polarizing layers are oriented at 0° and 90°. A second layer 410 is a liquid crystal polymer layer that acts as a quarter wave retarder at a wavelength of λ. A third layer 430 comprises a Norland adhesive that protects and separates the LCP layer 420 from a uniform LPP layer 440 at a 45° orientation. A fifth layer 450 comprises a liquid crystal polymer plus dye that acts as a linear polarizer. Other examples of focal plan arrays can be constructed using similar materials and thicknesses as the patterned circular polarizer of FIG. 4.

The illustrated polarization sensor can be manufactured as follows. A substrate 460 can be formed from glass soda lime 4-inch wafers. Two contact lithography masks can be used to fabricate of the 9 μm size micropolarizer array. The first layer 410 is a patterned photo-polymerizable polymers (LPP) (e.g., as provided by Dainippon Ink and Chemical) with pattern orientations of 0° and 90°. Liquid crystal polymer (LCP) is next coated on the next layer 420 to provide a quarter-wave retardance. This layer 420 serves as a quarter-wave plate and converts incident circular polarization into either 45° or 135° linear polarization. For an achromatic wave plate, this layer 420 can be made of multiple liquid crystal materials having different dispersion parameters. A buffer layer 430 is then utilized to protect and separate the layers. For example, Norland Optical Adhesive 60 (NOA60) photopolymer can be used as an adhesive for the buffer layer because the material does not dissolve the LCP and is optically transparent. Next, a second LPP layer 440 is coated and uniformly aligned at 45°. The next layer 450 is LCP with dye coated to form a linear polarizer.

The liquid crystal polymer technology employed in fabrication of the illustrated high resolution circular polarizer allows high resolution patterning and precise control of retardance. An achromatic polarizer can be achieved by combination of two retarder layers. In some examples, it is desirable that the extinction ratio be tailored to fit a specific application by changing dye concentration and polarizer thickness. For example, a micropolarizer with an extinction ratio of $10^2$ to $10^3$ can be achieved. After the pixelated micropolarizer arrays are fabricated, both polarization and extinction ratio can be measured. Surface quality and defects can be characterized by polarized microscopy using a WYKO NT 9000 surface optical profiler, Axometrics polarimeter, and scanning electron microscopy.

After characterizing the polarizer array, the polarizer array is integrated to the image sensor without cover window. Thus, the polarizer surface will face to the image sensor. In order to precisely align the pixelated polarizer array with the sensor pixel array, a computer controlled tip/tilt XYZ piezo stage with sub-micron resolution and a precision rotation mount can be used. A collimated laser beam from a 632 nm He—Ne laser and a polarization state generator can be used to monitor the alignment process. After the polarizer array is moved close to the sensor surface, the collimated beam illuminates the polarizer array and the image sensor detects the light passing through the polarizer array. By moving the pixelated polarizer array and changing the illumination polarization, the pixels detecting light can be dynamically monitored. For example, the light in one set of pixels (for example, pixels with 0° polarizers) can be maximized and light in the set of pixels can be minimized with orthogonal polarizers (for example, pixels with 90° polarizers). Desirably, the contrast ratio is better than 100. Once the pixelated polarizer is aligned with the sensor pixels, the polarizer holder is affixed with ultraviolet light curing glue.

X. Example Construction of Quantitative Polarization and Phase Microscope

An interferometer microscope can be constructed having the two-camera configuration depicted in FIG. 1. Computer processors (e.g., a general-purpose CPU) can be programmed to execute computer-readable instructions to obtain polarization parameters, quantitative phase, and fluorescence anisotropy in real time.

Two pairs of Olympus microscope objectives (having 0.65 numerical aperture (NA) and 0.25 NA) can be used as the objectives lenses 154 and 170. A doublet having a focal length of 200 mm works as the tube lens 183 so that the field of view of the objective matches the sensor size. Opto-mechanical components can be fabricated to accommodate different configurations. Because this illustrated examples is used in a polarization sensitive microscope, all optical components can be characterized using a well-calibrated Muller Matrix Polarimeter. Desirably, components with low depolarization effect are used in the system 100. It is further desirable that the components in the sample path and reference path have matched polarization properties. Two polarization state generators will be used, one for epi-illumination and another for transillumination. Once the PSG positions are aligned with the polarization camera 185, they are fixed in the illumination paths so that no calibration is needed when switching imaging modes.

XI. Example Dual-Camera Polarization Sensor

Figure 5B:
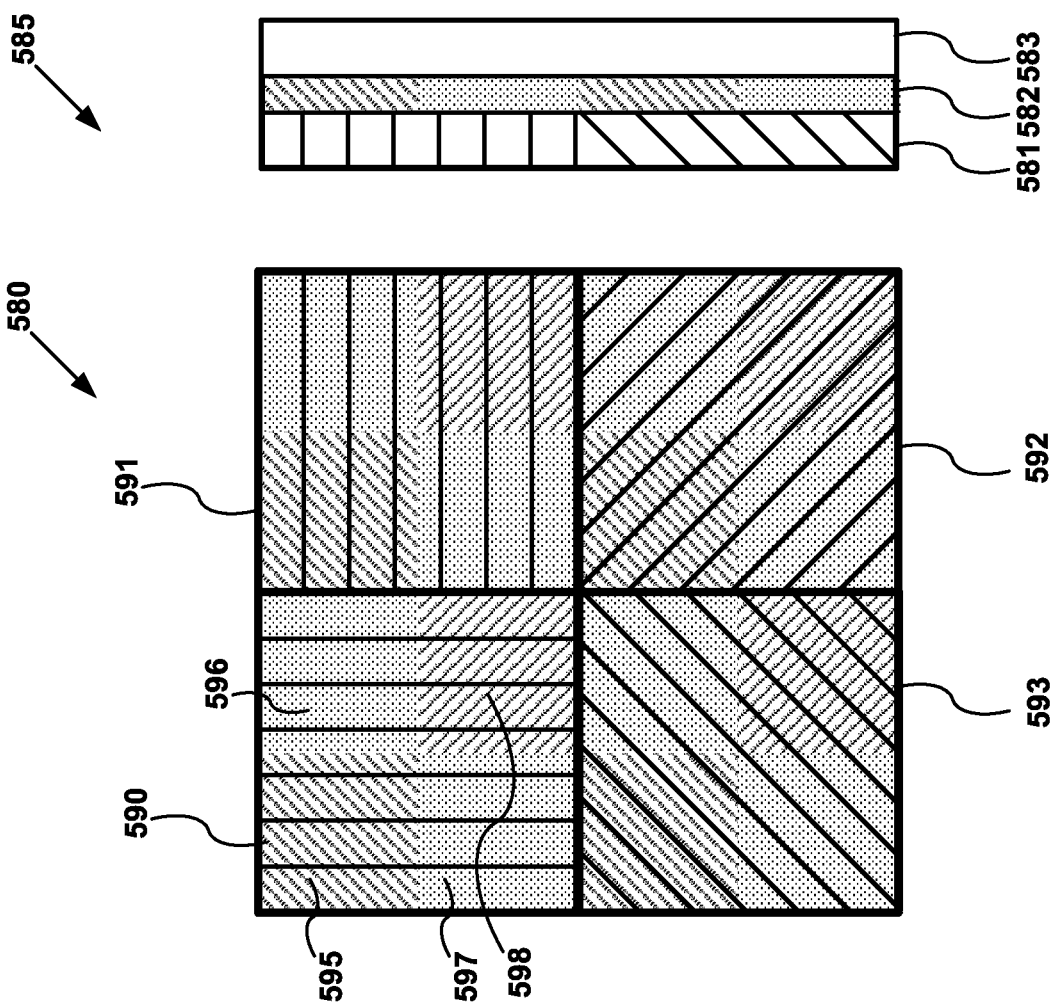
FIG. 5B is a diagram of a polarization-sensitive focal plane array, as can be used in certain examples of the disclosed technology, including the apparatus of FIG. 5A.
Figure 5A:
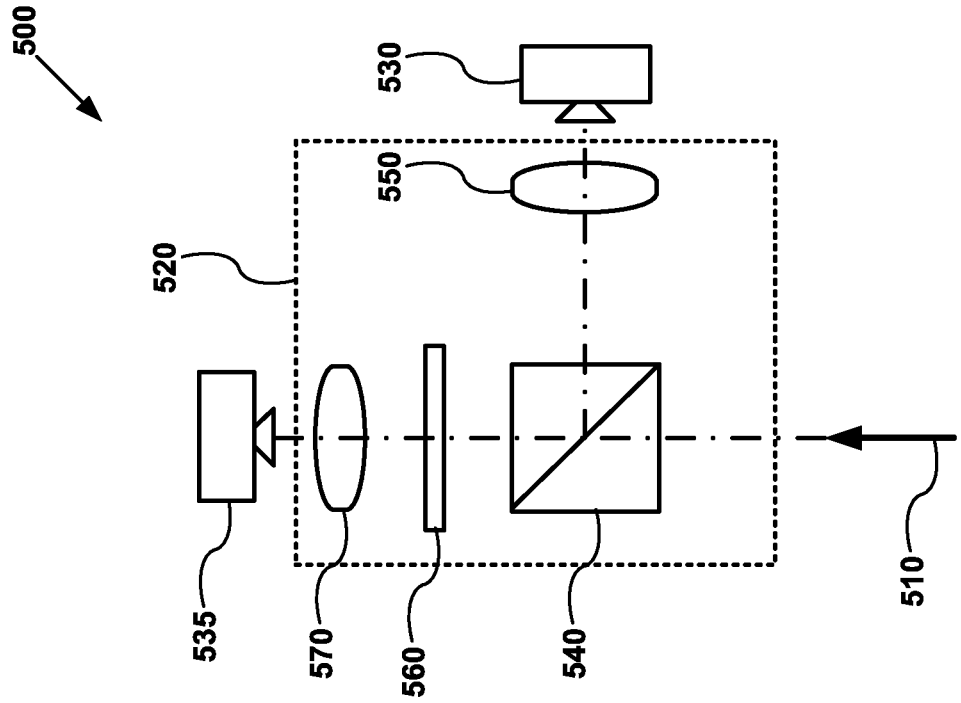
FIG. 5A is a schematic diagrams of dual-camera polarization sensor including two light sensors, as can be used in certain examples of the disclosed technology.

FIG. 5A is a system diagram 500 of an apparatus comprising an incoming image 510, a wavefront or image splitter 520, and light sensors 530 and 535 (each comprising a polarization sensitive focal plane array), as can be implemented in certain examples of the disclosed technology. FIG. 5B is a plan view 580 and cross-section view 585 of a polarization sensitive focal plane array that can be used in the light sensors, as can be implemented in certain examples of the disclosed technology.

As shown in FIG. 5A, an incoming image 510 in the form of a light beam is projected onto a beam splitter 540. The beam splitter reflects a first portion of the light into a first objective lens 550, which focuses the light into the aperture of a first image sensor 530. For example, the image sensor 530 can be a camera including a polarization sensitive focal plane array mounted to an image sensor. The beam splitter 540 transmits a second portion of the light through a quarter-wave plate 560, which changes the circularly polarized light to linearly polarized light. The light transmitted through the quarter-wave plate 560 is received by an objective lens 570 which focuses the light into the aperture of the second light sensor 535. The second light sensor 535 includes a polarization-sensitive focal plane array mounted to an image sensor similar to the first light sensor 530.

FIG. 5B illustrates one macro pixel of a polarization-sensitive focal plane array as can be used in certain examples of the disclosed technology, including the apparatus of FIGS. 1, 5A, 7, and 8. For example, the illustrated array can be formed from similar materials as used to form the polarization array discussed above regarding FIG. 2. In the illustrated example, there are four polarization superpixels for each macropixel of the array including a first superpixel 590 at a 0° orientation, a second superpixel 591 at a 90° polarization orientation, a third superpixel 592 at a 135° orientation, and a fourth superpixel 593 at a 45° polarization orientation. Each of the superpixels has a 2×2 pixel array comprising color filters that transmit light of different wavelengths. For example the first superpixel 590 includes a red filter pixel 595, two green filter pixels 596 and 597, and a blue filter pixel 598. The cross-sectional view 525 shows the relative positions of the polarization filters 581, color filters 582, and image sensor 583.

Figure 6:
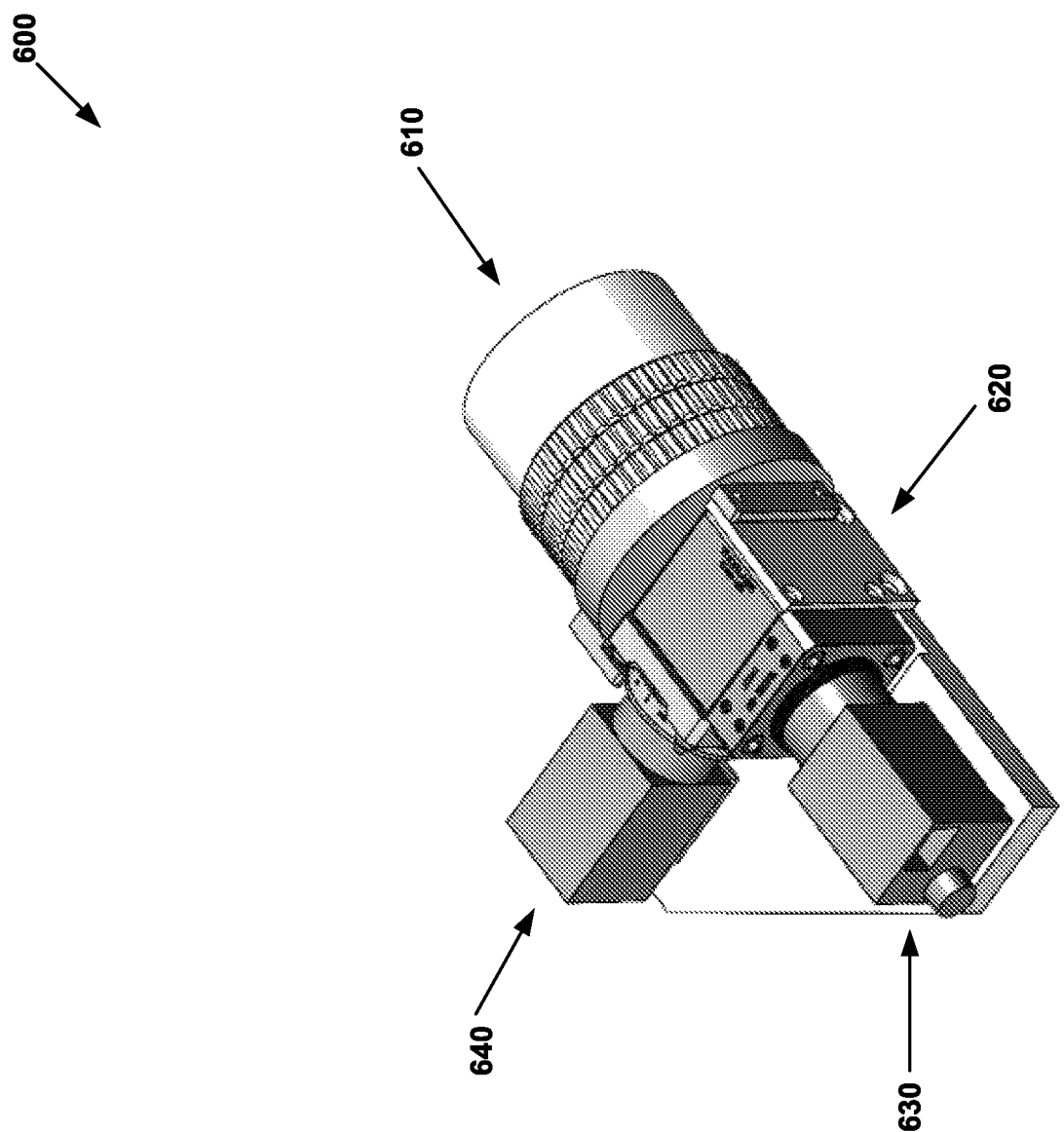
FIG. 6 is a drawing of the dual-camera polarization sensor of FIG. 5A, as can be implemented in certain examples of the disclosed technology.

FIG. 6 depicts an example apparatus 600 assembled according to the disclosed technology in FIG. 5. The apparatus 600 is an example of a dual-camera polarization sensor according to the diagram of FIG. 5A. As shown, a lens 610 receives and focuses light from a light source and is coupled to a wavefront or image splitter 620. Light from the split beam outputs are detected by the first camera 630 and the second camera 640. This configuration acts as an imaging polarimeter that can simultaneously measure all four components of the Stokes vector in three colors.

XII. Example Apparatus Comprising Interferometer and Polarization Sensor

Figure 7:
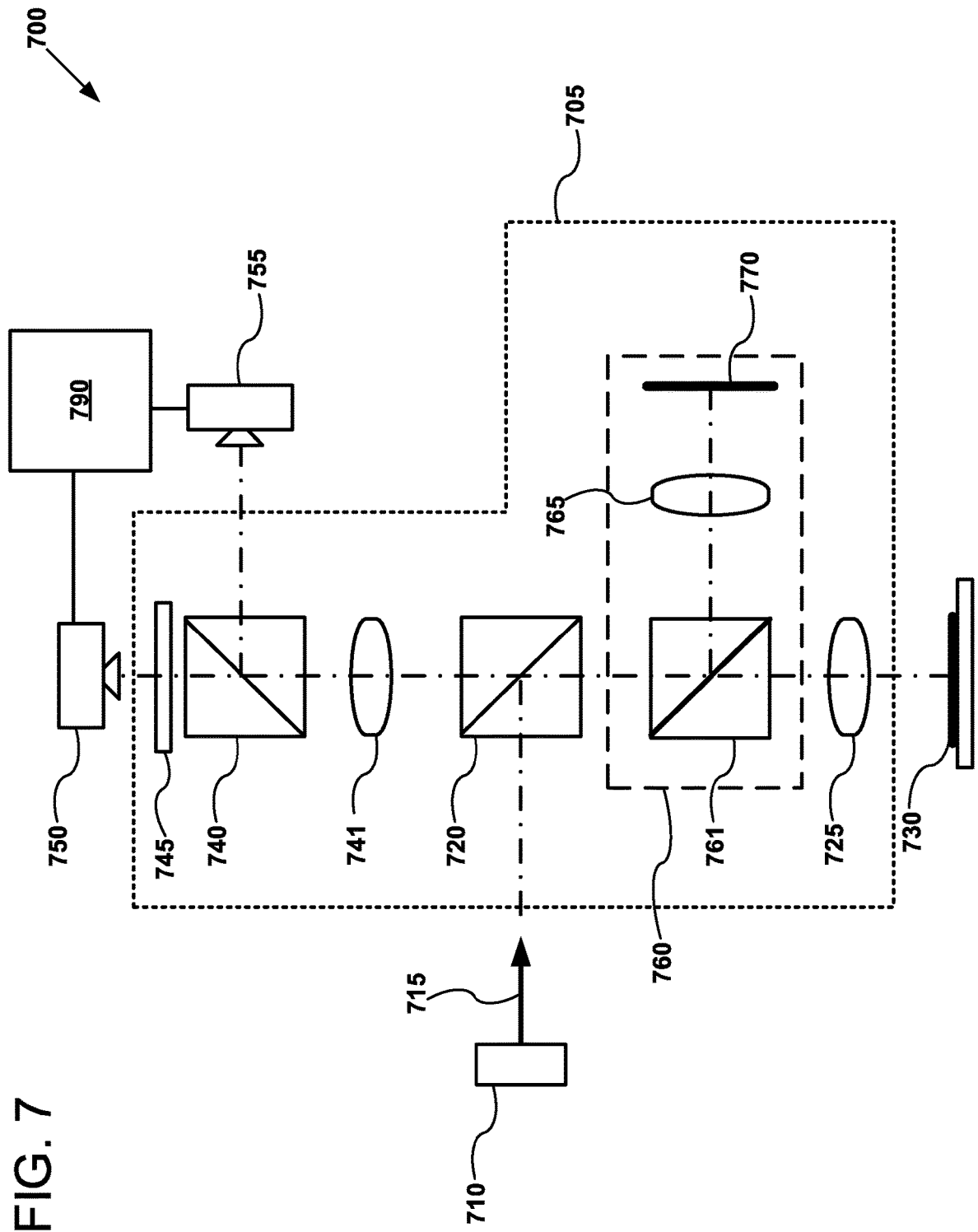
FIG. 7 is a schematic outlining an example of an apparatus including a light source, an interferometer, and two light sensors, including polarization-sensitive focal plane arrays, as can be implemented in certain examples of the disclosed technology.

FIG. 7 is a schematic diagram illustrating an example system 700 in which certain examples of the disclosed technology can be implemented. Similar components used to implement the system 100 of FIG. 1 can be used in the arrangement of the depicted example system 700. As shown in FIG. 7, an interferometer 705 is situated such that a light source 710 projects a light beam 715 onto a first beam splitter 720. The first beam splitter has a beam splitter plane and the beam splitter is situated to reflect a first portion of the received light to a sample 730. A second portion of the received light beam 715 is reflected to a second beam splitter 740 through an objective lens 741. The second beam splitter has a beam splitter plane and the beam splitter is situated to retransmit a first portion of the light through a quarter-wave plate 745 and on through to a first light sensor 750. The second beam splitter 740 reflects a second portion of the received light to a second light sensor 755. Each of the light sensors 750 and 755 includes a polarization-sensitive focal plane array. For example, the polarization focal plane array discussed above regarding FIG. 6 can be mounted to a CCD or CMOS image sensor and produce digital data representing intensities of the received light across the field of the image sensor.

The first portion of light reflected by the first beam splitter 720 is focused by an objective lens 725 to be directed to (e.g., transmitted through or projected onto) the sample 730 and then reflected back to the first beam splitter 720. In some examples, the apparatus can further include a movable reference arm 760 including a third beam splitter 761, for example a polarizing beam splitter, which transmits a first portion of the light onto the sample 730 through the objective lens 725, and which reflects a second portion of the light through an objective lens 765 onto a mirror 770 attached to the reference arm 760. The reference arm 760 is moved so as not to interact with the beams passing between the sample 730 and the beam splitter 720 when making polarization measurements.

XIII. Example Apparatus Comprising Interferometer and Polarization Sensor

Figure 8:
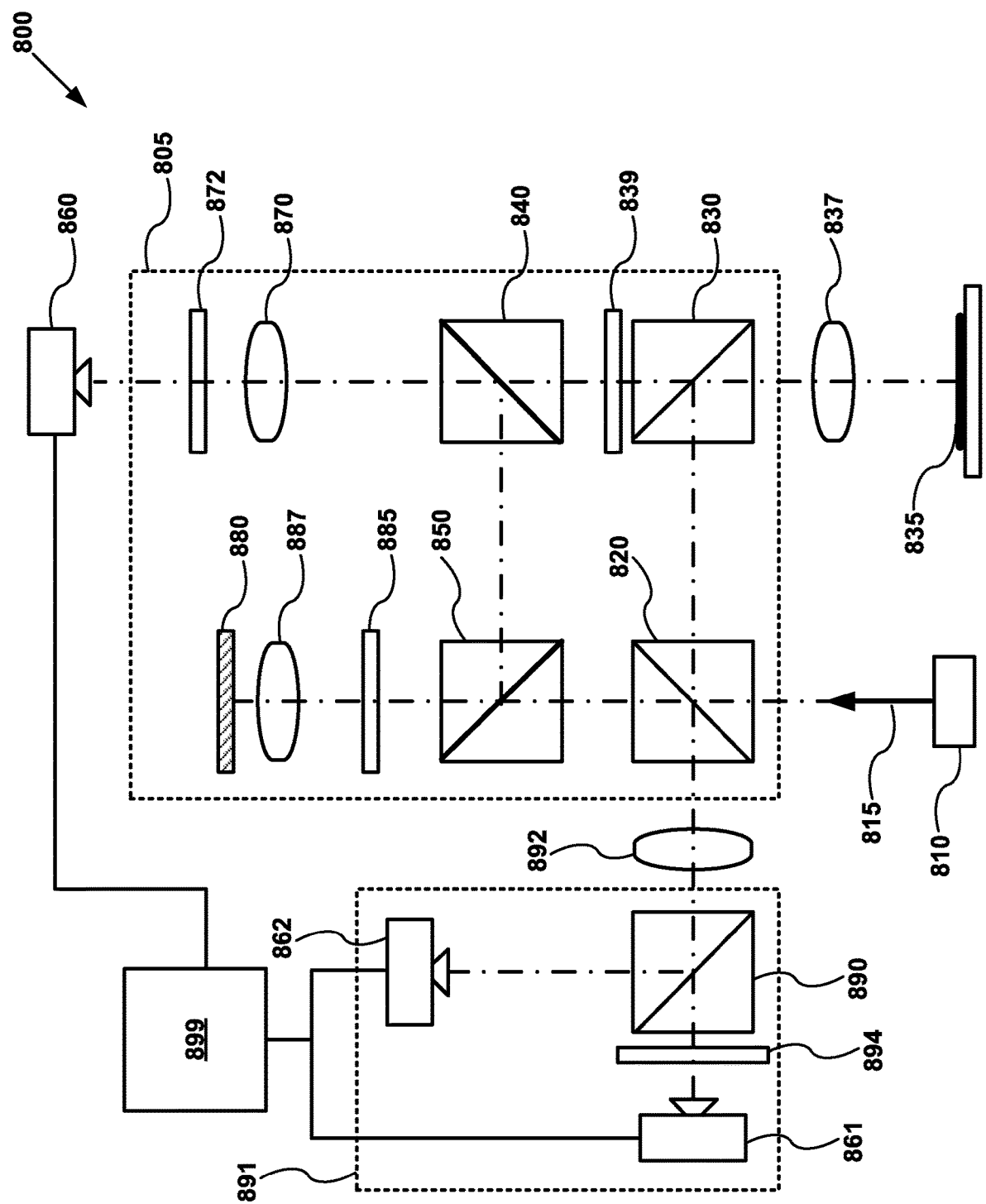
FIG. 8 is a schematic outlining an example of an apparatus including a light source, an interferometer, and three light sensors, including polarization-sensitive focal plane arrays, as can be implemented in certain examples of the disclosed technology.

FIG. 8 is a schematic diagram illustrating an example system 800 in which certain examples of the disclosed technology can be implemented. Similar components as those used to implement the system 100 of FIG. 1, including the polarization-sensitive focal plane array described above regarding FIG. 5B, can be used in the arrangement of the depicted example system 800. As shown in FIG. 8, an interferometer 805 is situated such that a light source 810 projects a light beam 815 onto a first beam splitter 820. The first beam splitter has a beam splitter plane and is situated to reflect a first portion of the light to a second beam splitter 830. Light reflected from the second beam splitter 830 is projected onto a sample 835 via an objective lens 837. A second portion of the light reflected from the second beam splitter 830 is transmitted through a polarizer 839, which substantially passes the only light having one state of polarization onto a third polarizing beam splitter 840. Another light beam passes from the light source 810 onto a third beam splitter 840. A portion of the light beam received by the fourth beam splitter 850 is reflected onto the third beam splitter 840. The third polarizing beam splitter 840 combines light received from the sample and from the fourth polarizing beam splitter 850 and directs the light to a first light sensor 860 of a plurality of light sensors 860, 861, and 862. The light combined and transmitted by the third beam splitter 840 is transmitted through an imaging lens 870 and through a quarter wave plate 872 before being received by the first light sensor 860. The first light sensor 860 includes a phase-sensitive focal plane array. Thus, phase imaging, including projection of interferograms onto an image sensor in the light sensor 860 can be performed. For example, intensity values indicating phase information for the projected interferogram can be generated.

Light transmitted from the light source 810 through the first beam splitter 820 is directed to a reference mirror 880 through the fourth polarizing beam splitter 850. The light from the fourth polarizing beam splitter 850 further passes through a quarter wave plate 885 and an objective lens 887 as it passes to the reference mirror 880. Circular polarized light reflected from the mirror 880 passes through the quarter wave plate 885 and becomes linearly polarized light having an orthogonal polarization direction with respect to the input light 815. Therefore, the light from the reference mirror 880 is reflected from the fourth beam splitter 850. Thus, light from the reference mirror 880 is transmitted to the third polarizing beam splitter from the first polarizing beam splitter 850.

The first polarizing beam splitter reflects light from the light source 810 to a fifth beam splitter 890 (forming part of a dual-camera polarization sensor 891) via an objective lens 892. Some of the light passes through the fifth beam splitter 890 through a quarter wave plate 894 and is received by the second light sensor 861. Some of the light from the fifth beam splitter 890 is reflected to the third light sensor 862. Polarization imaging can thus be performed using intensity values received at the second light sensor 861 and the third light sensor 862. In certain other examples, the dual-camera polarization sensor 891 can be replaced by a single camera configuration having a polarization sensitive focal plane array including a circular polarizer, as described above regarding FIG. 2.

A computer 899 comprising processors and computer-readable storage media storing computer executable instructions is coupled to the first, second, and third light sensors 860-862. Measurement data received from the light sensors can be combined in order to generate images and perform other image processing using the phase imaging and polarization imaging data. In some examples, each of the first, second, and third light sensors include the same type of polarization-sensitive focal plane array. In some examples, the computer 899 can be configured to execute instructions that cause its processors to calculate a Stokes vector from intensity data received from at least one of the light sensors. In some examples, at least one and, in some cases, all of the light sensors generate interferograms having different relative linear phase shift. For example, a phase-sensitive focal plane array in the first light sensor can have pixels having portions where the phase of incoming light is linearly shifted by varying amounts, for example by 0°, by 45°, and by 90°, respectively.

Any suitable light source can be used for implementing the illustrated sources 710 and 810 including one or more of the following: a light-emitting diode, a liquid crystal, or a timed multiplexed light source. Further, any of the illustrated light sensors (including light sensors 180, 185, 750, 755, 860, 861, or 862) can be coupled to communicate with a computing system (e.g., computing system 790 or 899 (e.g., via a wired connection, a wireless connection, or a network connection)), which system can include one or more processors, memory, an input interface configured to receive data from the first light sensor and/or the second light sensor, and one or more computer-readable storage media storing computer-readable instructions that when executed by the processors cause the system to perform methods of processing images received from the first light sensor and/or the second light sensor via the input interface. For example, the illustrated systems 100, 700, and 800 can be arranged to implement an interferometer microscope.

XIV. Example Method of Processing Light with an Interferometer

Figure 9:
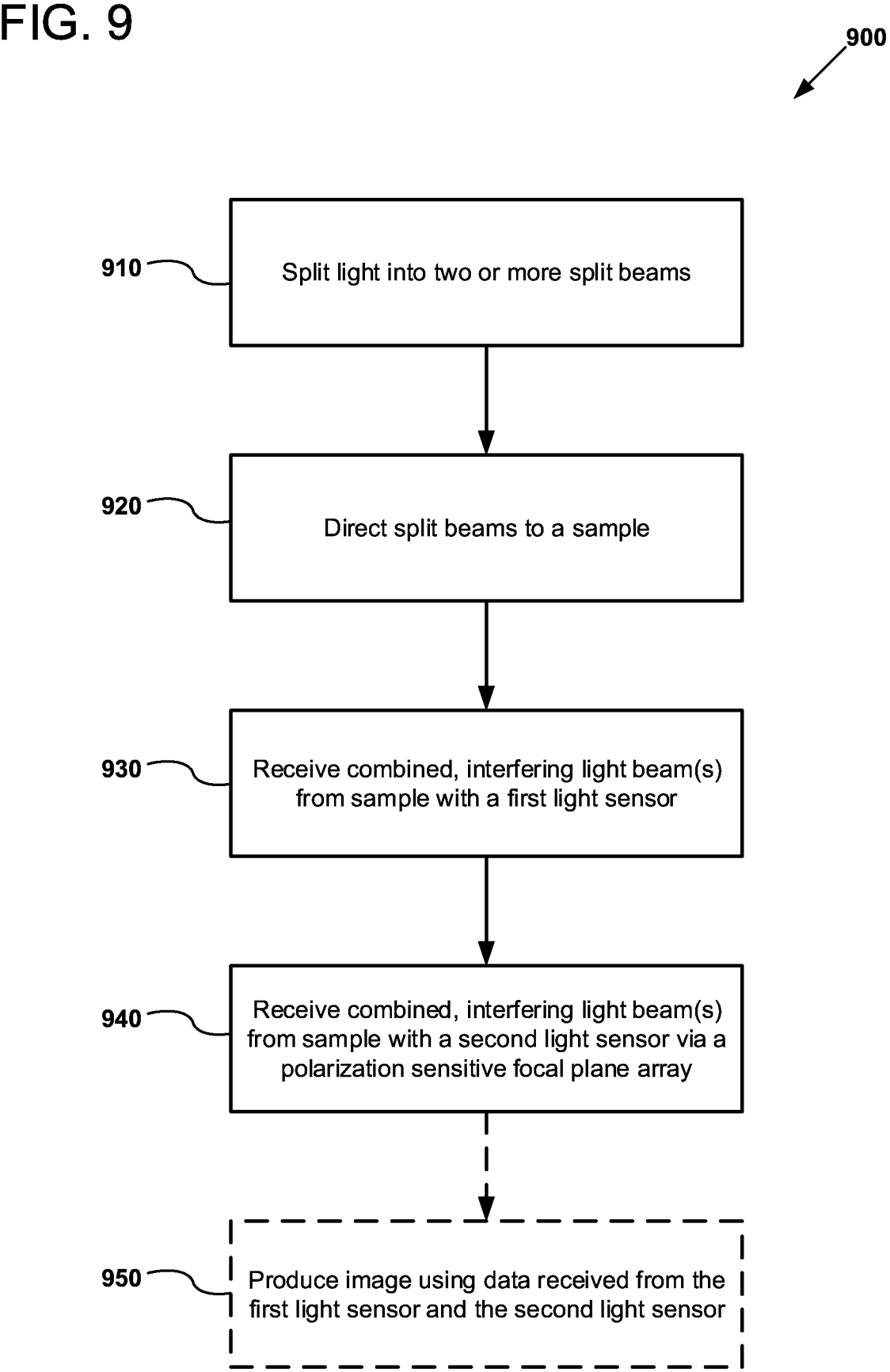
FIG. 9 is a flow chart outlining an example method of illuminating a sample with a split beam and receiving light via a polarization sensitive focal plane array, as can be performed in certain examples of the disclosed technology.

FIG. 9 is a flow chart 900 outlining an example method of using an interferometer including at least one light sensor having a polarization sensitive focal plane array, as can be performed in certain examples of the disclosed technology. For example, the illustrated systems 100, 700, and/or 800 can be used to perform the illustrated method.

At process block 910, light received from a light source is split into two or more split beams. For example, one or more beam splitters can be used to generate the split beam outputs. In some examples, the beam splitters are polarizing beam splitters.

At process block 920, at least one of the split beams is directed to a sample. For example, the sample can be affixed in a sample region of the interferometer. The sample can be of a birefringence material or a non-birefringence material. In some examples, all of the split beams are projected onto the sample. In some examples, at least one of the split beams is transmitted through the sample. Light from the sample (e.g., reflected or transmitted through the sample) is combined into at least one interfering, split beam output. The split beam output can be used, for example, to produce an interferogram on a first light sensor.

At process block 930, light is received from the sample with a first light sensor. The split beam output including combined, interfering light beams can be projected onto the first light sensor.

At process block 940, light is received from the sample at a second light sensor having a polarization sensitive focal plane array. For example, any of the polarization sensitive focal plane arrays discussed above can be used with the second light sensor. In some examples, the focal plane array includes a circular polarizer.

At process block 950, an image is produced using data received from the first light sensor and the second light sensor. For example, polarization, phase, fast axis orientation, and/or color differences can be processed and compared between the two light sensors and used to generate an image. In some examples, generating an image includes measuring phase using data received from the light sensors.

In some examples, generating an image includes generating quantified polarization information using data from the light sensors. In some examples, generating an image includes calculating a Stokes vector from intensity data received from one or more light sensors.

XV. Example Method of Manufacturing an Interferometer

Figure 10:
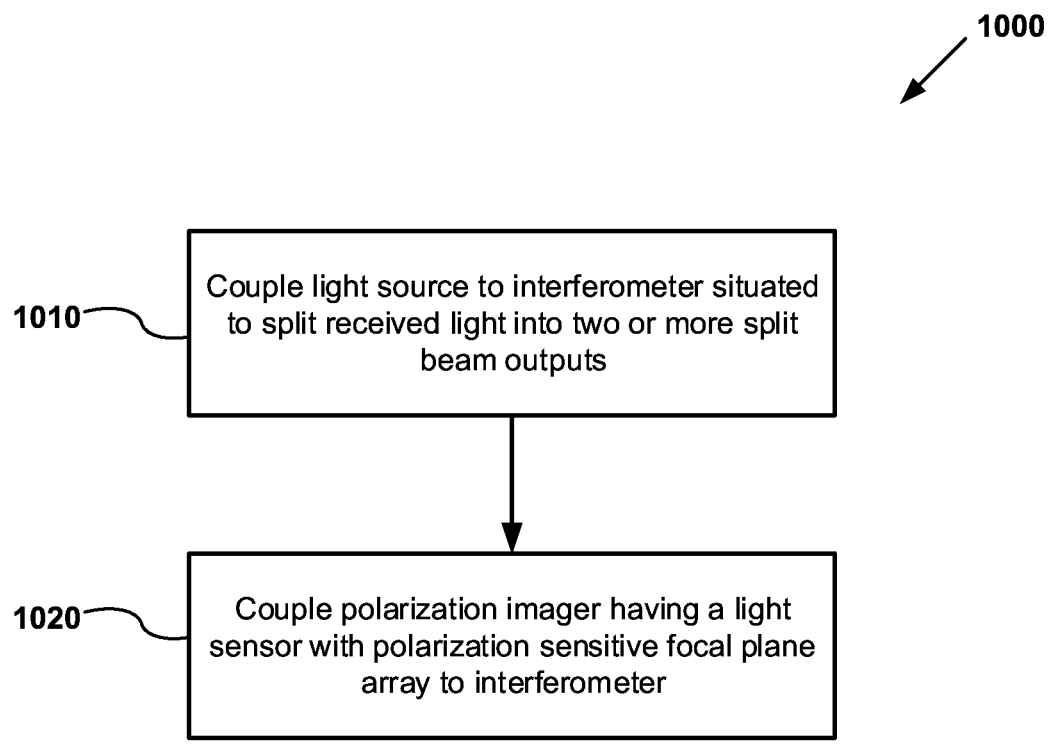
FIG. 10 is a flow chart outlining an example method of manufacturing an interferometer as can be performed according to certain examples of the disclosed technology.

FIG. 10 is a flow chart 1000 outlining an example method of manufacturing an interferometer, as can be performed in certain examples of the disclosed technology. For example, the outlined method can be used in manufacturing systems such as 100, 700, or 800.

At process block 1010, one or more light sources are coupled to an interferometer situated to split received light into two or more split beam outputs. For example, one or more beam splitters can be situated to produce combined, interfering light beams when the light source is activated. The interferometer can be configured so that at least one of the split light beams can be focused onto a sample, and light reflected or transmitted through the sample is received at a first light sensor. In some examples, a polarization sensitive focal plane array is coupled to the light sensor.

At process block 1020, a polarization imager having a second light sensor with a polarization sensitive focal plane array is coupled to the interferometer. For example, the interferometer can be configured so that at least one of the split light beams will be focused onto a sample situated in a sample region, and light reflected or transmitted through the sample is received at a second light sensor. A polarization sensitive focal plane array is coupled to the second light sensor.

Computer-readable instructions can be executed by the processors for image capture and processing. The software can be developed in any suitable programming language (e.g., C++) and using software development kits provided with a particular CMOS camera and polarization state generator. The camera and polarization state generator are desirably synchronized for image capture. The image processing software can include two modules for performing processing for quantitative polarization imaging and quantitative phase imaging. The polarization module includes functions for camera calibration, Stokes parameter extraction, Mueller Matrix calculation, birefringence distributions. In some examples, the polarization image processing module can be implemented using MATLAB. In some examples, the polarization image processing module is implemented in C++, improving processing speed so that the images can be processed in real time.

XVI. Example Computing Environment

Figure 11:
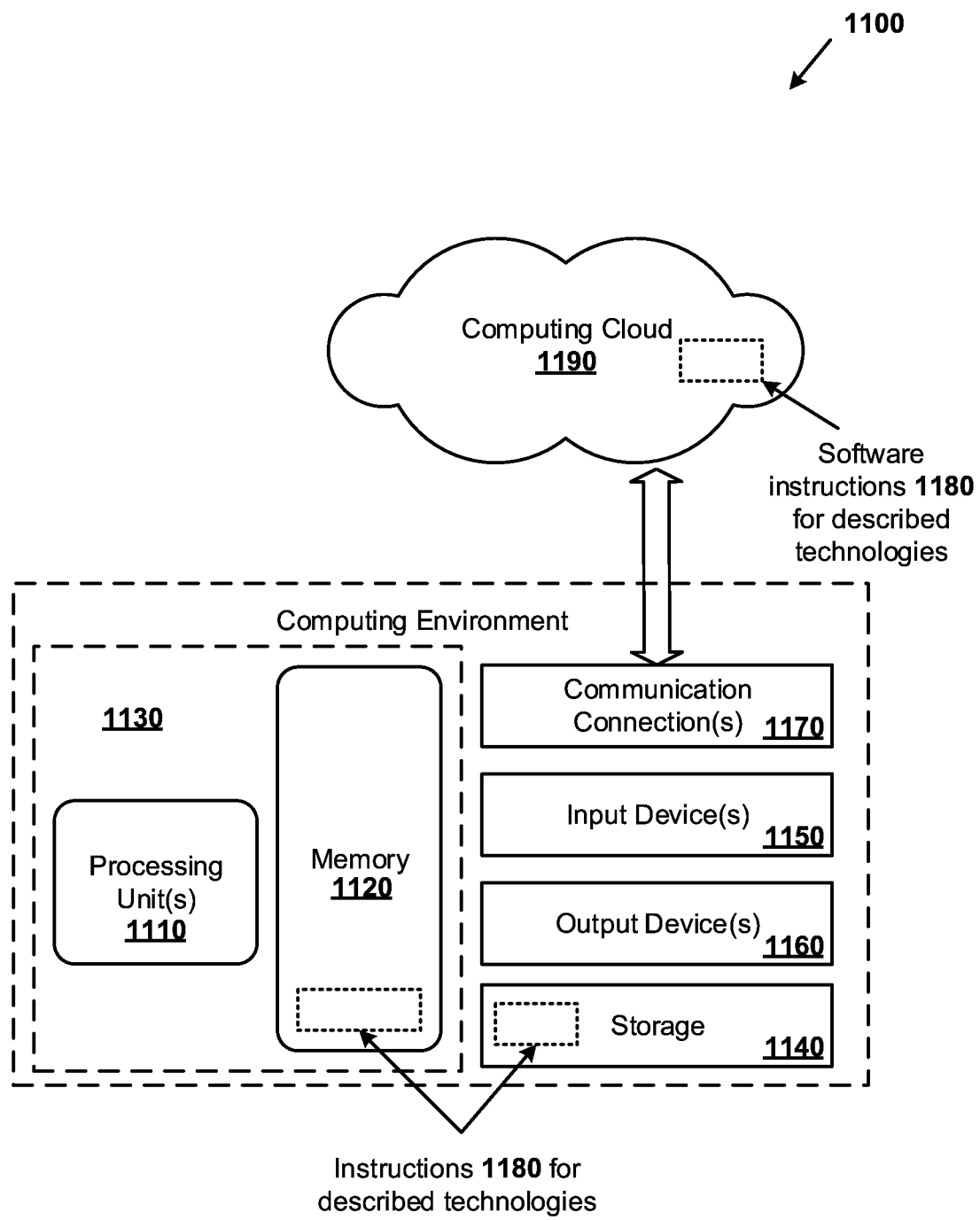
FIG. 11 is a diagram of an example computing environment in which certain examples of the disclosed technology can be implemented.

FIG. 11 illustrates a generalized example of a suitable computing environment 1100 in which described embodiments, techniques, and technologies can be implemented. For example, the computing environment 1100 can implement image processing for date received from the light sensors, as described herein.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180, images, and video that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and that can be accessed within the computing environment 1100. The storage 1140 stores instructions for the software 1180, plugin data, and messages, which can be used to implement technologies described herein.

The input device(s) 1150 may be a touch input device, such as a keyboard, keypad, mouse, touch screen display, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, video, or other data in a modulated data signal. The communication connection(s) 1170 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and destination agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1190. For example, agents can be executing vulnerability scanning functions in the computing environment while agent platform (e.g., bridge) and destination agent data consumer service can be performed on servers located in the computing cloud 1190.

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

XVII. Additional Examples of the Disclosed Technology

Additional examples of the disclosed technology are recited below with reference to the foregoing disclosure. In some examples of the disclosed technology, an apparatus that can measure polarization and phase of light received from a sample, the apparatus includes a light source, an interferometer configured to: receive light generated by the light source and split the received light into two or more split beams directed to a sample in a sample region, and combine the projected split beams into at least one interfering, split beam output, and also a polarization imager comprising a first light sensor and a second light sensor having a polarization-sensitive focal plane array, the first light sensor and the second light sensor being situated to receive the at least one interfering, split beam output. In some examples of the apparatus, the polarization-sensitive focal plane array comprises a circular polarizer. In some examples, one or more but not all of the light sensors of the polarization imagers have polarization-sensitive focal plane arrays. In some examples, all of the light sensors of the polarization imagers have polarization-sensitive focal plane arrays.

In some examples of the apparatus, the polarization imager further comprises a third light sensor, the second light sensor and the third light sensor being situated to receive respective split beams from a beam splitter or a polarizing beam splitter. In some examples of the apparatus, at least one of the second or the third light sensors comprises a phase-sensitive focal plane array. In some examples of the apparatus, each of the first, second, and third light sensors are situated to receive one of the two or more split beam outputs from the interferometer. In some examples of the apparatus, each of the first, second, and third light sensors comprise the same type of polarization sensitive focal plane array. In some examples of the apparatus, the polarization imager generates quantified polarization information using data from the second light sensor and the third light sensors. Some examples of the apparatus include one or more processors configured to execute computer-executable instructions that cause the processors to calculate a Stokes vector from intensity data received from at least one of the first, second, or third light sensors. Some examples of the apparatus include one or more processors configured to execute computer-executable instructions that cause the processors to calculate phase information from three interferograms received from at least one of the first, second, or third light sensors, each of the interferograms having a different relative linear phase shift.

In some examples of the apparatus, at least one of the first, second, and third light sensors comprises a polarization sensitive focal plane array including a circular polarizer. In some examples of the apparatus, at least one of the first, second, and third light sensors comprises a polarization sensitive focal plane array having a plurality of superpixels, each of the superpixels including three different orientations of a polarizer filter. In some examples of the apparatus, the interferometer comprises a first beam splitter and a second beam splitter, the first beam splitter has a beam splitter plane, the first beam splitter being situated to reflect a first portion of the received light to a sample and to reflect a second portion of the received light to a second beam splitter. and the second beam splitter has a beam splitter plane, the second beam splitter being situated to reflect a first portion of the reflected second portion of the received light to the first light sensor and to reflect a second portion of the reflected second portion of the received light to the second light sensor.

In some examples of the apparatus, the second beam splitter is further situated to receiving a sample light beam reflected from the sample and transmit a portion of the sample light beam to the first light sensor and transmit a portion of the sample light beam to the second light sensor. In some examples of the apparatus, the portion of the sample beam transmitted to the first light sensor is on substantially the same axis as the first portion of the reflected second portion. In some examples of the apparatus, the interferometer further comprises a third beam splitter situated between the first beam splitter and the sample, the third beam splitter being situated to reflect a portion of light to a mirror in a movable reference arm. In some examples of the apparatus, the third beam splitter is a polarizing beam splitter. In some examples of the apparatus, the interferometer further comprises a polarizer situated between the first beam splitter and the second beam splitter. In some examples of the apparatus, the first beam splitter and/or the second beam splitter are polarizing beam splitters.

Some examples of the apparatus include an objective lens situated between the first beam splitter and the second beam splitter. Some examples of the apparatus include a wave plate situated to alter polarization of the split beam output transmitted to the first light sensor or the second light sensor. Some examples of the apparatus include a quarter-wave plate situated to shift phase of one of the split beam outputs by 90°. Some examples of the apparatus include an objective lens situated between the interferometer and the first light sensor or the second light sensor. In some examples of the apparatus, the interferometer is situated in a Mach-Zehnder or a Michelson configuration.

Any number of suitable, disclosed focal plane arrays can be coupled to one or more light sensors in the polarization imager. In some examples, the focal plane array comprises a plurality of macropixels, each of the macropixels comprising a block of superpixels, and a first superpixel of the block comprises a first polarization filter configured to transmit light of a first state of polarization and to substantially block light of a second state of polarization orthogonal to the first state and a second superpixel of the block comprises a second polarization filter configured to transmit light of a third state of polarization and to substantially block light of a fourth state of polarization orthogonal to the third state; and the first and third states of polarization are different. In some examples, the first superpixel, the second superpixel, or the first and second superpixel each include an array of pixels, at least one of the pixels being configured to block light having a certain range of wavelengths. In some examples, the first superpixel, the second superpixel, or the first and second superpixel each include an array of pixels, at least one of the pixels being configured to block or to admit light, wherein the blocked or admitted light is at least one or more of the following: ultraviolet, visible, or near infrared. In some examples, the first superpixel, the second superpixel, or the first and second superpixel each include an array of pixels, at least one of the pixels is configured to block or to admit light, and a material used for the pixels is selected based on the sensitivity of the respective light sensor. In some examples, the first superpixel, the second superpixel, or the first and second superpixel each include an array of pixels, at least one of the pixels being configured to transmit light of a particular color wavelength, and at least one other of the pixels being configured to transmit light of a different color wavelength than the at least one of the pixels.

Any suitable, disclosed light sensor and light source can be used. For example at least one of the light sensors can include a camera and a charge-coupled device (CCD) or a complementary metal oxide (CMOS) digital image sensor. As another example, the light source can be produced by one or more of the following: a light emitting diode, a liquid crystal, or a time-multiplexed light source. In some examples, the light source is a low-coherence light source. In some examples, the light source is a coherent light source.

In some examples, a computer system includes one or more processors, memory, and an input interface that is configured to receive data from the first light sensor and/or the second light sensor from any of the disclosed apparatus. In some examples, one or more computer readable storage media storing computer-readable instructions that when executed by the processors, causes the computer system to perform a method of processing images received from the first light sensor and/or the second light sensor via the input interface.

In some examples, the apparatus is an interferometer microscope. In some examples, an interferometer microscope includes any of the disclosed apparatus.

In some examples, of the disclosed technology, a method includes splitting light received from a light source into two or more split beams, directing the two or more split beams to a sample, combining light from the sample into a combined, interfering light beam, receiving the combined, interfering light beam with a first light sensor, and receiving the combined, interfering light beam with a second light sensor via a polarization sensitive focal plane array. In some examples, the light is projected onto the sample and reflected, then combined into the combined, interfering light beam. In some examples, the light is transmitted through the sample. In some examples the method includes producing an interferogram of the combined interfering light beams onto the first light sensor. In some examples the method includes producing an image using data received from the first light sensor and the second light sensor. In some examples the method includes measuring phase of the received light at the first and/or second sensor using data received from the first light sensor and the second light sensor. In some examples the method includes using a polarization sensitive focal plane array having a circular polarizer. In some examples the method includes receiving light from the sample with a third light sensor via a polarization sensitive focal plane array. In some examples of the method, at least one of the first, second, or third light sensors are situated to receive one of the two or more split beam outputs. In some examples of the method, at least one of the first, second, or third light sensors comprise the same type of polarization sensitive focal plane array. In some examples the method includes generating quantified polarization information using data from at least one of the first, second, or third light sensors. In some examples the method includes, with a processor executing computer-executable instructions, calculating a Stokes vector from intensity data received from at least one of the first, second, or third light sensors. In some examples the method includes, with a processor executing computer-executable instructions, calculating phase information from interferograms received from at least one of the first, second, or third light sensors, each of the interferograms having a different relative phase shift. In some examples of the method, at least one of the first, second, or third light sensors comprises a polarization sensitive focal plane array having a plurality of superpixels, each of the superpixels including three different polarizer filters.

In some examples the method includes with a first beam splitter, reflecting a first portion of the received light from the light source onto the sample and reflecting a second portion of received light to a second beam splitter, and with the second beam splitter, reflecting a first portion of the reflected second portions of the received light to the first light sensor and reflecting a second portion of the reflected second portion of the received light to the second light sensor.

In some examples the method includes, with the second beam splitter, transmitting a first portion of light reflected from the sample to the first light sensor and transmitting a second portion of light reflected form the sample to the second light sensor. In some examples the method includes with a third beam splitter situated between the first beam splitter and the sample, reflecting a portion of light reflected from the sample onto a mirror in a movable reference arm. In some examples, at least one of the beam splitters is a polarizing beam splitter.

In some examples the method includes altering polarization of light transmitted to the first light sensor or the second light sensor with a wave plate.

In some examples of the method, the polarization focal plane array comprisese a plurality of macropixels, each of the macropixels comprising a block of superpixels, including a first superpixel of the block comprises a first polarization filter configured to transmit light of a first state of polarization and to substantially block light of a second state of polarization orthogonal to the first state and including a second superpixel of the block comprises a second polarization filter configured to transmit light of a third state of polarization and to substantially block light of a fourth state of polarization orthogonal to the third state; and the first and third states of polarization are different.

In some examples of the disclosed technology, a method of manufacturing an apparatus that can measure polarization and phase of light received from a sample region includes coupling a light source to an interferometer situated to receive light generated by the light source, the interferometer being further situated to split the received light into two or more split beam outputs; and coupling a polarization imager comprising a second light sensor having a polarization sensitive focal plane array to the interferometer, the second light sensor being situated to receive a light beam from the sample region.

In some examples, the method of manufacturing includes configuring the interferometer in a Mach-Zehnder or a Michelson configuration.

In some examples, the method of manufacturing includes situating a first beam splitter so as to reflect a first portion of light received from the light source onto the sample region and so as to reflect a second portion of light received from the light source to a second beam splitter and situating a second beam splitter so as to reflect a first portion of the reflected second portion of the received light to the first light sensor and further situating the second beam splitter so as to reflect a second portion of the reflected second portion of the received light to the second light sensor.

In some examples, the method of manufacturing includes situating a third beam splitter to reflect a portion of light reflect from the sample region onto a mirror in a movable reference arm.

In view of the many possible examples to which the principles of the disclosed technology may be applied, it should be recognized that the illustrated examples are only preferred examples and should not be taken as limiting the scope of the claims. Rather, the scope of the claimed subject matter is defined by the following claims. We therefore claim as our invention all that comes within the scope of these claims.

What is claimed is:

1. An apparatus that can measure polarization and phase of light received from a sample, the apparatus comprising:
   a light source;
   an interferometer configured to:
      receive light generated by the light source and, with a polarizing beam splitter, split the received light into two or more split beams, at least one of the split beams being directed to a sample in a sample region, and
      combine at least two of the split beams into at least one interfering, split beam output;
   a first light sensor; and
   a second light sensor having a polarization-sensitive focal plane array, the first light sensor and the second light sensor being situated to receive the at least one interfering, split beam output.

2. The apparatus of claim 1, wherein the polarization-sensitive focal plane array comprises a circular polarizer.

3. The apparatus of claim 1, further comprising a third light sensor, the second light sensor and the third light sensor being situated to receive respective split beams from a beam splitter or a polarizing beam splitter.

4. The apparatus of claim 3, wherein at least one of the second or the third light sensors comprises a phase-sensitive focal plane array.

5. The apparatus of claim 3, wherein at least one of the first, second, and third light sensors comprises a polarization sensitive focal plane array including a circular polarizer.

6. The apparatus of claim 3, wherein at least one of the first, second, and third light sensors comprises a polarization sensitive focal plane array having a plurality of superpixels, each of the superpixels including three different orientations of a polarizer filter.

7. The apparatus of claim 3, wherein the polarizing beam splitter is a first polarizing beam splitter, and the interferometer comprises the first polarizing beam splitter and a second beam splitter, wherein:
   the first polarizing beam splitter has a beam splitter plane, the first beam splitter being situated to reflect a first portion of the received light to a sample and to reflect a second portion of the received light to the second beam splitter; and
   the second beam splitter has a beam splitter plane, the second beam splitter being situated to reflect a first portion of the reflected second portion of the received light to the first light sensor and to reflect a second portion of the reflected second portion of the received light to the second light sensor.

8. The apparatus of claim 7, wherein the interferometer further comprises a third beam splitter situated between the first polarizing beam splitter and the sample, the third beam splitter being situated to reflect a portion of light to a mirror in a movable reference arm.

9. The apparatus of claim 1, further comprising a wave plate situated to alter polarization of the split beam output transmitted to the first light sensor or the second light sensor.

10. The apparatus of claim 1, further comprising a quarter wave plate situated to shift phase of one of the split beam outputs by 90°.

11. The apparatus of claim 1, wherein the focal plane array comprises a plurality of macropixels, each of the macropixels comprising a block of superpixels, and wherein:
   a first superpixel of the block comprises a first polarization filter configured to transmit light of a first state of polarization and to substantially block light of a second state of polarization orthogonal to the first state; and
   a second superpixel of the block comprises a second polarization filter configured to transmit light of a third state of polarization and to substantially block light of a fourth state of polarization orthogonal to the third state; and the first and third states of polarization are different.

12. The apparatus of claim 1, wherein:
   the first light sensor and the second light sensor are configured to, with the at least one interfering, split beam output, concurrently measure at least one of: intensity, wavelength, polarization, or phase of light.

13. The apparatus of claim 1, further configured to:
simultaneously capture a first image with the first light sensor and a second image with the second light sensor.

14. A method comprising:
with a polarizing beam splitter, splitting light received from a light source into two or more split beams;
directing at least one of the two or more split beams to a sample;
combining light from the sample into a combined, interfering light beam;
receiving the combined, interfering light beam with a first light sensor; and
receiving the combined, interfering light beam with a second light sensor via a polarization sensitive focal plane array.

15. The method of claim 14, further comprising producing an interferogram of the combined interfering light beams onto the first light sensor.

16. The method of claim 14, further comprising measuring phase of the received light at the first and/or the second light sensor using data received from the first light sensor and the second light sensor.

17. The method of claim 14, wherein the polarization sensitive focal plane array comprises a circular polarizer.

18. The method of claim 14, further comprising:
with the first beam splitter, reflecting a first portion of the received light from the light source onto the sample and reflecting a second portion of received light to a second beam splitter; and
with the second beam splitter, reflecting a first portion of the reflected second portions of the received light to the first light sensor and reflecting a second portion of the reflected second portion of the received light to the second light sensor.

19. The method of claim 18, further comprising:
with a third beam splitter situated between the first beam splitter and the sample, reflecting a portion of light reflected from the sample onto a mirror in a movable reference arm.

20. The method of claim 14, further comprising:
with the received light beam at the first light sensor and the second light sensor, concurrently measuring at least one of: intensity, wavelength, polarization, or phase of light.

21. The method of claim 20, wherein the concurrently measuring is performed without adjusting position of the at least one of: the light source, the sample, the first light sensor, the second light sensor, the polarization focal plane array, or the polarizing beam splitter.

22. The method of claim 20, wherein the concurrently measuring is performed without adjusting position of any of: the light source, the sample, the first light sensor, the second light sensor, the polarization focal plane array, or the polarizing beam splitter.

23. A method of manufacturing an apparatus that can measure polarization and phase of light received from a sample region, the method comprising:
coupling a light source to an interferometer situated to receive light generated by the light source, the interferometer being further situated to, with a polarizing beam splitter, split the received light into two or more split beam outputs, the polarizing beam splitter being situated to direct at least one of the two or more split beam outputs to the sample region; and
coupling a first light sensor and a second light sensor having a polarization sensitive focal plane array to the interferometer, the second light sensor being situated to receive a light beam from the sample region.

24. The method of claim 23, wherein the polarizing beam splitter is a first beam splitter, the method further comprising:
situating the first beam splitter so as to reflect a first portion of light received from the light source onto the sample region and so as to reflect a second portion of light received from the light source to a second beam splitter; and
situating a second beam splitter so as to reflect a first portion of the reflected second portion of the received light to the first light sensor and further situating the second beam splitter so as to reflect a second portion of the reflected second portion of the received light to the second light sensor.

* * * * *